US006895476B2

(12) United States Patent
Tierney et al.

(10) Patent No.: US 6,895,476 B2
(45) Date of Patent: May 17, 2005

(54) RETRY-BASED LATE RACE RESOLUTION MECHANISM FOR A COMPUTER SYSTEM

(75) Inventors: Gregory E. Tierney, Chelmsford, MA (US); Stephen R. Van Doren, Northborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 201 days.

(21) Appl. No.: 10/263,743

(22) Filed: Oct. 3, 2002

(65) Prior Publication Data

US 2004/0068613 A1 Apr. 8, 2004

(51) Int. Cl.[7] ................................ G06F 12/00
(52) U.S. Cl. ................. 711/141; 711/147; 709/213
(58) Field of Search ................ 711/141–148; 709/212–217, 245–246

(56) References Cited

U.S. PATENT DOCUMENTS

| | | |
|---|---|---|
| 4,847,804 A | 7/1989 | Shaffer et al. |
| 5,222,224 A | 6/1993 | Flynn et al. |
| 5,233,616 A | 8/1993 | Callander |
| 5,297,269 A | 3/1994 | Donaldson et al. |
| 5,303,362 A | 4/1994 | Butts, Jr. et al. |
| 5,313,609 A | 5/1994 | Baylor et al. |
| 5,490,261 A | 2/1996 | Bean et al. |
| 5,530,933 A | 6/1996 | Frink et al. |
| 5,537,575 A | 7/1996 | Foley et al. |
| 5,551,005 A | 8/1996 | Sarangdhar et al. |
| 5,579,504 A | 11/1996 | Callander et al. |
| 5,608,893 A | 3/1997 | Slingwine et al. |
| 5,737,757 A | 4/1998 | Hassoun et al. |
| 5,761,731 A | 6/1998 | Van Doren et al. |
| 5,905,998 A | 5/1999 | Ebrahim et al. |
| 6,014,690 A | 1/2000 | Van Doren et al. |
| 6,055,605 A | 4/2000 | Sharma et al. |
| 6,061,765 A | 5/2000 | Van Doren et al. |
| 6,088,771 A | 7/2000 | Steely, Jr. et al. |
| 6,094,686 A | 7/2000 | Sharma |
| 6,101,420 A | 8/2000 | Van Doren et al. |
| 6,105,108 A | 8/2000 | Steely, Jr. et al. |
| 6,108,737 A | 8/2000 | Sharma et al. |
| 6,108,752 A | 8/2000 | Van Doren et al. |
| 6,125,429 A | 9/2000 | Goodwin et al. |
| 6,154,816 A | 11/2000 | Steely et al. |
| 6,202,126 B1 | 3/2001 | Van Doren et al. |
| 6,249,520 B1 | 6/2001 | Steely, Jr. et al. |
| 6,356,983 B1 * | 3/2002 | Parks ..................... 711/145 |

FOREIGN PATENT DOCUMENTS

EP 0 817 074 A1 7/1998

OTHER PUBLICATIONS

Gharachorloo, K., Lenoski, D., Laudon, J., Gibbons, P., Gupta, A. and Hennessey, J., Memory Consistency and Event Ordering in Scalable Shared–Memory Multiprocessors, (c) 1990 IEEE, pp. 15–26.

(Continued)

*Primary Examiner*—Nasser Moazzami

(57) ABSTRACT

A retry-based mechanism resolves late race conditions in a computer system between a first processor writing modified data back to main memory and a second processor trying to obtain a copy of the modified data. A low occupancy cache coherency protocol tracks ownership and sharing status of memory blocks. When a memory reference operation forwarded from the second processor results in a miss at the first processor's cache, because the requested memory block was written back to memory, the first processor issues a Retry command to the second processor. In response to the Retry command, the second processor issues another memory reference operation. This time, however, the operation explicitly specifies the version of the memory block being written back to main memory. Once the memory block has been written back to main memory, thereby providing main memory with the desired version, a copy is sent to the second processor.

19 Claims, 14 Drawing Sheets

OTHER PUBLICATIONS

Jouppi, N., Improving Direct-Mapped Cache Performance by the Addition of a Small Fully-Associative Cache and Prefetch Buffers, (c) 1990 IEEE, pp. 364–373.

Agarwal, A., Simoni, R., Hennesy, J. and Horowitz, M., An Evaluation of Directory Schemes for Cache Coherence, (c)1988 IEEE, pp. 353–362.

Papapanaroqs, M. and Patel, J., A Low-Overhead Coherence Solution for Multiprocessors with Private Cache Memories, (c) 1984 IEEE, pp. 284–290.

UltraSPARC Ultra Port Architecture (UPA): The New-Media System Architecture, http://www.sun.com/processors/whitepapers/wp95-023.html, Copyright 1994–2002 Sun Microsystems, pp. 1–4.

Porting OpenVMS Applications to Intel Itanium Architecture, Compaq Computer Corporation, Apr. 2002, pp. 1–17.

Adve, S., Hill, M., Miller, B. and Nester, R., Detecting Data Races on Weak Memory Systems, (c) 1991 ACM, pp. 234–243.

Gharachorloo, K., Sharma, M., Steely, S. and Van Doren, S., Architecture and Design of AlphaServer GS320, Nov. 2000, pp. 1–12.

IEEE Standard for Scalable Coherent Interface (SCI), (c) 1993 IEEE, pp. Table of Contents, 30–34 and 141–188.

Scales, D. and Gharachorloo, K., Design and Performance of the Shasta Distributed Shared Memory Protocol, XP-000755264, Jul. 7, 1997, pp. 245–252.

Scales, D., Gharachorloo, K. and Thekkath, C., Shasta: A Low Overhead, Software-Only Approach for Supporting Fine-Grain Shared Memory, XP-002173083, Jan. 10, 1996, pp. 174–185.

Scales, D. and Gharachorloo, K., Towards Transparent and Efficient Software Distributed Shared Memory, XP-000771029, Dec. 1997, pp. 157–169.

Scales, D., Gharachorloo, K. and Aggarwal, A., Fine-Grain Software Distributed Shared Memory on SMP Clusters, WRL Research Report 97/3, Feb. 1997, pp. i and 1–28.

* cited by examiner

| DIRECTORY 100 | | | | |
|---|---|---|---|---|
| ADDRESS 103 | OWNER 104 | SHARERS 106 | | |
| | | FIRST SHARER 106a | SECOND SHARER 106b | THIRD SHARER 106c |
| 102a — 308 | P3 | - | - | - |
| 102b — 157 | MEMORY | P6 | P4 | P3 |
| 102c — 221 | MEMORY | P7 | P1 | - |
| 102d — 414 | P1 (MEMORY) | P2 | - | - |

| MAIN DIRECTORY REGION 902 | | | DIRECTORY | | WRITE-BACK DIRECTORY REGION 904 | | |
|---|---|---|---|---|---|---|---|
| OWNER/ SHARER 914 | SHARER LIST 916 | | UNUSED 918 | ECC 920 | WRITER 922 | UNUSED 924 | ECC 926 |
| | SHARER 0 916a | SHARER 1 916b (SHARER VECTOR) 916c | | | | | |
| 906a → MEMORY | 0 | 0 | 0 | - | MEMORY | 0 | - |
| 906b → MEMORY | P0 | 0 | 0 | - | MEMORY | 0 | - |
| 906c → P0 | 0 | 0 | 0 | - | MEMORY | 0 | - |
| 906d → P0 | P1 | 0 | 0 | - | MEMORY | 0 | - |
| 906e → P2 | 0 | 0 | 0 | - | MEMORY | 0 | - |
| 906f → P2 | P3 | 0 | 0 | - | P2 | 0 | - |
| 906g → P2 | 0 | 0 | 0 | - | P2 | 0 | - |
| 906h → P2 | P12 | 0 | 0 | - | 0 | 0 | - |
| 907 → P9 | 0 | 0100110000000000 | 0 | - | MEMORY | 0 | - |
| 908 → P6 | 0 | 0100010000000000 | 0 | - | MEMORY | 0 | - |
| 909 → P10 | 0 | 0000010000000000 | 0 | - | P12 | 0 | - |
| 910 → P9 | 0 | 0000010000000010 | 0 | - | MEMORY | 0 | - |

906 brackets 906a–906h

420

RETRY-BASED LATE RACE RESOLUTION MECHANISM FOR A COMPUTER SYSTEM

CROSS-REFERENCE TO RELATED APPLICATION

This application is related to the following co-pending, commonly owned U.S. Patent Applications:

U.S. patent application Ser. No. 10/263,739 titled DIRECTORY STRUCTURE PERMITTING EFFICIENT WRITEBACKS IN A SHARED MEMORY COMPUTER SYSTEM, filed Oct. 3, 2002;

U.S. patent application Ser. No. 10/263,836 titled CHANNEL-BASED LATE RACE RESOLUTION MECHANISM FOR A COMPUTER SYSTEM, filed Oct. 3, 2002; and U.S. patent application Ser. No. 10/263,738 titled LINKED LIST EARLY RACE RESOLUTION MECHANISM, filed Oct. 3, 2002.

BACKGROUND OF THE INVENTION

1. Field of the Invention

This invention relates to computer systems and, more specifically, to cache coherency protocols for use by large shared memory, multiprocessor computer systems.

2. Background Information

A computer system typically comprises one or more processors linked to a main memory by a bus or other interconnect. In most computer systems, main memory organizes the instructions and data being stored into units typically referred to as "blocks" each of which is separately addressable and may be of a fixed size. Instructions and data are typically moved about the computer system in terms of one or more blocks.

Ordinarily, a processor will retrieve data, e.g., one or more blocks, from main memory, perform some operation on it, and eventually return the results back to main memory. Retrieving data from main memory and providing it to a processor can take significant time especially in terms of the high operating speeds of processors. To reduce such latencies as well as to reduce the number of times a processor must access main memory, modern processors and/or processor chipsets include one or more cache memories or caches. A cache is a small, fast memory module that is placed in close proximity to the processor. Many caches are static random access memories (SRAMs), which are faster, but more expensive, than dynamic random access memories (DRAMs), which are often used for main memory. The cache is used to store information, e.g., data or instructions, which the processor is currently using or is likely to use in the near future. There are two basic types of caches: "write-through" caches and "write-back" caches.

With a write-through cache, whenever a processor modifies or updates a piece of data in the processor's cache, main memory's copy of that data is automatically updated. This is accomplished by having the processor write the data back to memory whenever the data is modified or updated. A write-back cache, in contrast, does not automatically send modified or updated data to main memory. Instead, the updated data remains in the cache until some more convenient time, e.g., when the processor is idle, at which point the modified data is written back to memory. The utilization of write-back caches typically improves system performance. In some systems, a write-back or victim buffer is provided in addition to the cache. "Victim data" refers to modified data that is being removed from the processor's cache in order to make room for new data received at the processor. Typically, the data selected for removal from the cache is data the processor is no longer using. The victim buffer stores this modified data which is waiting to be written back to main memory. The use of a victim buffer frees up space in the cache for other data. Modified data in the victim buffer is eventually "victimized", i.e., written back to main memory, at some convenient time.

Although the implementation of write-back or victim buffers have increased the performance of computer systems, there are some drawbacks. For example, the addition of a victim buffer requires additional logic and storage or memory space at the processor chipset increasing cost, complexity and size of the processor chipset.

Symmetrical Multiprocessor (SMP) Systems

Multiprocessor computing systems, such as symmetrical multiprocessor (SMP) systems, provide a computer environment in which software applications may run on a plurality of processors using a single address space or shared memory abstraction. In a shared memory system, each processor can access any data item without a programmer having to worry about where the data is or how to obtain its value. This frees the programmer to focus on program development rather than on managing partitioned data sets and communicating values.

Cache Coherency

Because more than one processor of the SMP system may request a copy of the same memory block from main memory, cache coherency protocols have been developed to ensure that no processor relies on a memory block that has become stale, typically due to a modification or update performed to the block by some other processor. Many cache coherency protocols associate a state with each cache line. A given memory block, for example, may be in a shared state in which copies of the block may be present in the caches associated with multiple processors. When a memory block is in the shared state, a processor may read from, but not write to, the respective block. To support write operations, a memory block may be in an exclusive state. In this case, the block is owned by a single processor which may write to the cache line. When the processor updates or modifies the block, its copy becomes the most up-to-date version, while corresponding copies of the block at main memory and/or other processor caches become stale.

When a processor wishes to obtain exclusive ownership over a memory block that is currently in the shared state (i.e., copies of the block are present in the caches of other processors) invalidate requests are typically issued to those other processors. When an invalidate request is received by a given processor, its cache is searched for the specified memory block. If the block is found, it is transitioned to an invalid state. Many caches assign or associate a valid bit with each memory block or cache line stored in the cache. If the bit is asserted, then the cache line is considered to be valid and may be accessed and utilized by the processor. When a memory block is initially received from main memory, the valid bit is asserted and the memory block is stored in the cache. When an invalidate request is received, the valid bit of the respective cache line is de-asserted, thereby indicating that the cache line is no longer valid.

There are two classes of cache coherency protocols: snooping and directory based. With snooping, the caches monitor or snoop all transactions traversing the shared memory bus, looking for transactions that reference a memory block stored at the cache. If such a transaction is detected, the cache updates the status information for its copy of the memory block based on the snoop transaction. In this way, every cache that has a copy of a given memory block also has a copy of the status information of that block. With a directory based protocol, the state of each block is kept in a single, centralized location in the system, called a directory. Status information is not maintained in the individual caches.

FIG. 1 is a highly schematic illustration of a prior art directory 100. Directory 100 has a plurality of entries 102a–d each of which corresponds to a respective memory block. The directory 100 is organized, moreover, such that each entry 102a–d has a plurality of fields or cells for storing state and/or status information for the respective block. In particular, the directory 100 has an address column 103 that stores the address of the memory block, an owner column 104 that stores the identity of the entity, e.g., a processor or main memory itself, that is considered to be the owner of the memory block, and a sharer column 106 that stores the identity of those processors or other system entities that have a shared copy of the block.

The sharer column 106 may have a plurality of sub-columns 106a–c, each of which may contain the identity of a particular processor that has a shared copy of the respective memory block. If a request for shared access to a memory block is received from a first processor, P1, main memory examines the directory entry, e.g., entry 102c, for the block to determine its owner. As memory is itself the owner of the block, memory sends its copy of the block to P1 and enters P1's identifier (ID) into one of the sharer fields, e.g. field 106b, of the respective directory entry, e.g., entry 102c, thereby noting that P1 has a shared copy of the block. Since P1 only requested shared access to the memory block, the contents of the entry's owner field 104 are not modified.

If P1 issues a request for exclusive or write access to some other memory block, e.g., the block corresponding to entry 102d, main memory again examines the contents of entry 102d. Suppose that, at the time the request is received, the owner field reflected that memory was the owner of the memory block as shown in parentheses. In this case, memory sends the block to P1, and replaces the contents of the owner field 104 with P1's ID to reflect that P1, rather than memory, is now the owner of the memory block. P1 may then modify or update the memory block. If a request from a second processor, P2, is subsequently received for a shared copy of this memory block, main memory examines entry 102d of the directory 100 and determines that P1 is the owner of the memory block. Because its copy of the block, i.e., the copy stored at main memory, may be stale, memory does not forward its copy to P2. Instead, memory may be configured to forward the request to P1 and add P2's ID to one of the sharer fields, e.g., field 106a. In response to the forwarded request, P1 may then supply P2 with a copy of the modified memory block from P1's cache. Alternatively, main memory may be configured to force P1 to relinquish ownership of the memory block and return the modified version to memory so that memory can send a copy of the up-to-date version to P2.

It has been recognized that a computer system's cache coherency protocol is a key factor in the system's ultimate performance. Poorly designed cache coherency protocols can result in latencies, bottlenecks, other inefficiencies and/ or higher complexity, each of which may reduce performance and/or increase cost. Bottlenecks, for example, often arise in high occupancy controllers, such as directory controllers. "Occupancy" is a term of art and refers to the amount of time a controller is unavailable, e.g., for the servicing of requests, following receipt of an earlier request.

In some cache coherency protocols, when a directory controller receives a request corresponding to a memory block, it thereafter becomes unavailable to service other requests for that memory block until certain acknowledgements to the earlier request are received back at the directory controller. The stalling of requests or references until the directory controller is once again available may degrade system performance. Thus, efforts have been made to design low occupancy cache coherency protocols, which allow multiple requests to the same memory block to be executing substantially simultaneously within the computer system.

Low occupancy cache coherency protocols can nonetheless result in the creation of coherency races that, in turn, can cause system deadlock and/or starvation. Accordingly, a need exists for a low occupancy cache coherency protocol that avoids deadlock and/or starvation in the face of coherency races.

SUMMARY OF THE INVENTION

Briefly, the invention relates to a mechanism for resolving late race conditions that arise within a computer system when a memory reference operation issued by a source entity reaches its intended target only to find that the referenced data is no longer there. The late race resolution mechanism of the present invention directs the source entity to retry its memory reference operation. This time, however, the memory reference operation specifies a particular version of the desired data. The retry-based late race resolution mechanism of the present invention is designed for use in a large, shared memory, multiprocessor computer system, such as a symmetrical multiprocessor (SMP) computer system, utilizing a low occupancy cache coherency protocol. The SMP system may comprise one or more nodes, each having a plurality of processors and a portion of shared memory, that are coupled together by an interconnect fabric.

The shared memory is configured to store data in terms of memory blocks, and each processor preferably has a cache for storing copies of memory blocks being used by the processor. Each processor further includes a miss address file (MAF) that keeps track of outstanding requests for memory blocks not currently stored in the processor's cache. The shared memory further includes one or more directories for storing status information for the memory blocks. In the illustrative embodiment, the directory has a plurality of entries each of which is assigned to a respective memory block, and is organized into a main directory region and a write-back directory region. Each entry includes an owner/ sharer field and a sharer list within the main directory region, and a writer field within the write-back region. The owner/ sharer field indicates which entity, e.g., processor, is the owner of the block, while the sharer list indicates which entities, e.g., other processors, have a copy of the memory block in their caches. The writer field identifies the last owner to have written the memory block back to the memory subsystem.

In operation, when a first entity, such as a processor, requests write access over a given memory block, the owner/sharer field of the respective directory entry is loaded with an identifier (ID) assigned to the first processor, thereby reflecting that the first processor is the owner of the memory block. When the first processor completes its modification of the memory block, it writes the block back to the memory subsystem. In response, the writer field of the respective directory entry is loaded with the first processor's ID, the owner/sharer field is left unchanged, and the modified data is written back to memory. Preferably, the processors do not have victim caches and thus do not buffer a copy of modified data pending completion of the write back operation.

Before the write back operation is received, however, a request for the same memory block may be received at the directory from a second processor. As the first processor is still considered to be the owner of the memory block, the request is forwarded to the first processor for servicing. At the first processor, however, the forwarded request will result in a miss as the first processor removed the block from its cache as part of the write back to memory. This condition is known as a late race condition.

To resolve the late race, the first processor issues a Retry command directly to the second processor. In response to the Retry command, the second processor issues a new command, generally referred to as a Request_Version command, to the shared memory. The Request_Version command requests a particular version of the memory block, namely the version being written back to memory by the first processor. Upon receipt of the Request_Version command at the shared memory, a check is performed to see whether the version of the memory block currently stored at main memory matches the version specified in the Request_Version command. In particular, memory compares the contents of the directory entry's writer field with the version specified in the Request_Version command. If the writer field matches the specified version, then main memory concludes that is has the desired version and sends a copy of the memory block from memory to the second processor.

If, however, memory does not have the desired version, i.e., the writer field does not match the specified version, main memory preferable issues a Retry command to the second processor. The Retry command does not include any data. That is, memory does not forward the Request_Version command to the entity that currently owns the specified block for servicing, unlike an ordinary request. The second processor responds to the Retry command by issuing another Request_Version command again specifying the desired version of the data, and main memory responds to the Request_Version in the same manner as described above. This process is repeated until main memory receives and stores the specified version of the data, and can thus send it to the second processor in response to the next Request_Version command.

BRIEF DESCRIPTION OF THE DRAWINGS

The invention description below refers to the accompanying drawings, of which:

FIG. 1, previously discussed, is a highly schematic diagram of a conventional directory;

FIG. 9 is a highly schematic block diagram of the directory of the present invention.

DETAILED DESCRIPTION OF AN ILLUSTRATIVE EMBODIMENT

Figure 2:
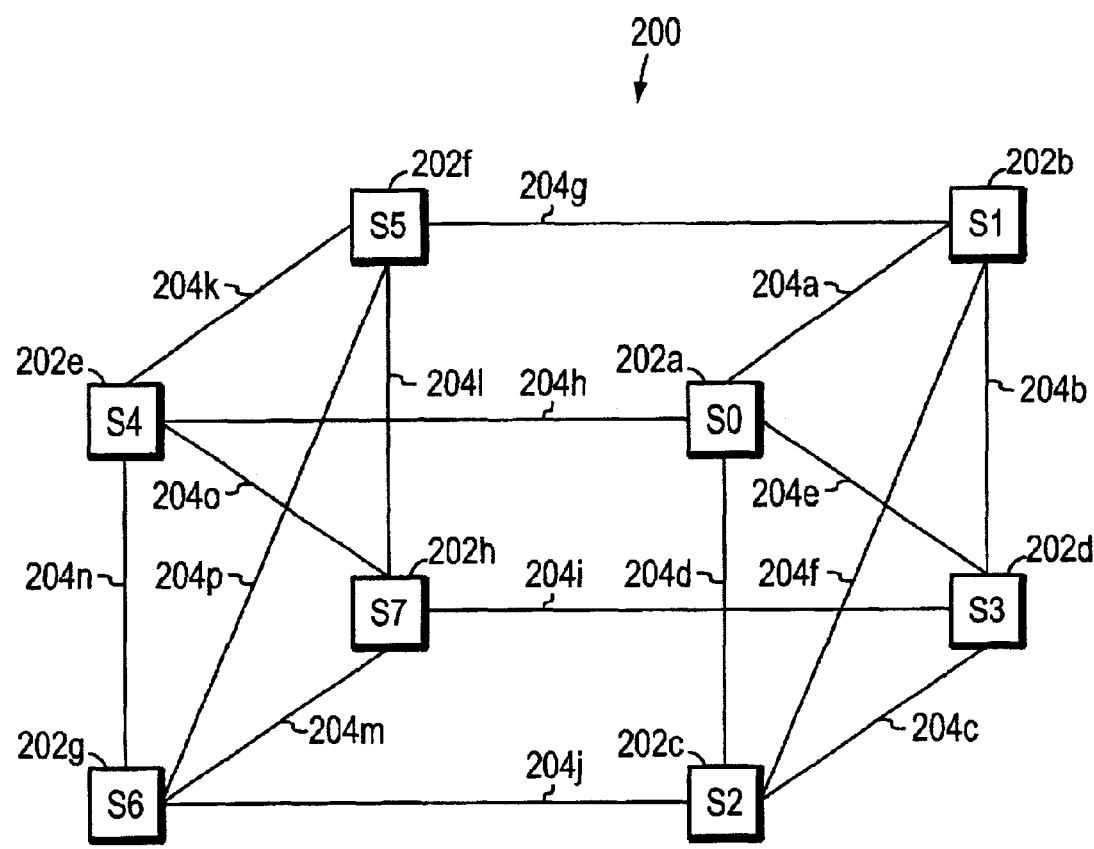
FIG. 2 is a highly schematic functional block diagram of a multi-processor node.

FIG. 2 is a highly schematic illustration of a preferred multiprocessor node 200 for use with the present invention. The node 200 comprises a plurality of, e.g., eight, sockets, S0–S7, which are designated by reference numerals 202a–h. The eight sockets 202a–h are logically located in three-dimensional space at the corners of a cube, and are interconnected by a plurality of inter-processor links 204a–p. Thus, each socket can communicate with any other socket of the node 200. In the illustrative embodiment, sockets forming two opposing sides of the node 200 are fully interconnected, while the two sides are connected only along the edges of the cube. That is, sockets S0–S3, which form one side of the cube, and S4–S7, which form the opposing side of the cube, are fully interconnected with each other, while the two opposing sides are connected by four inter-socket links 204g–j. As described herein, each socket includes one or more processors and has or is coupled to two main memory subsystems.

Figure 3:
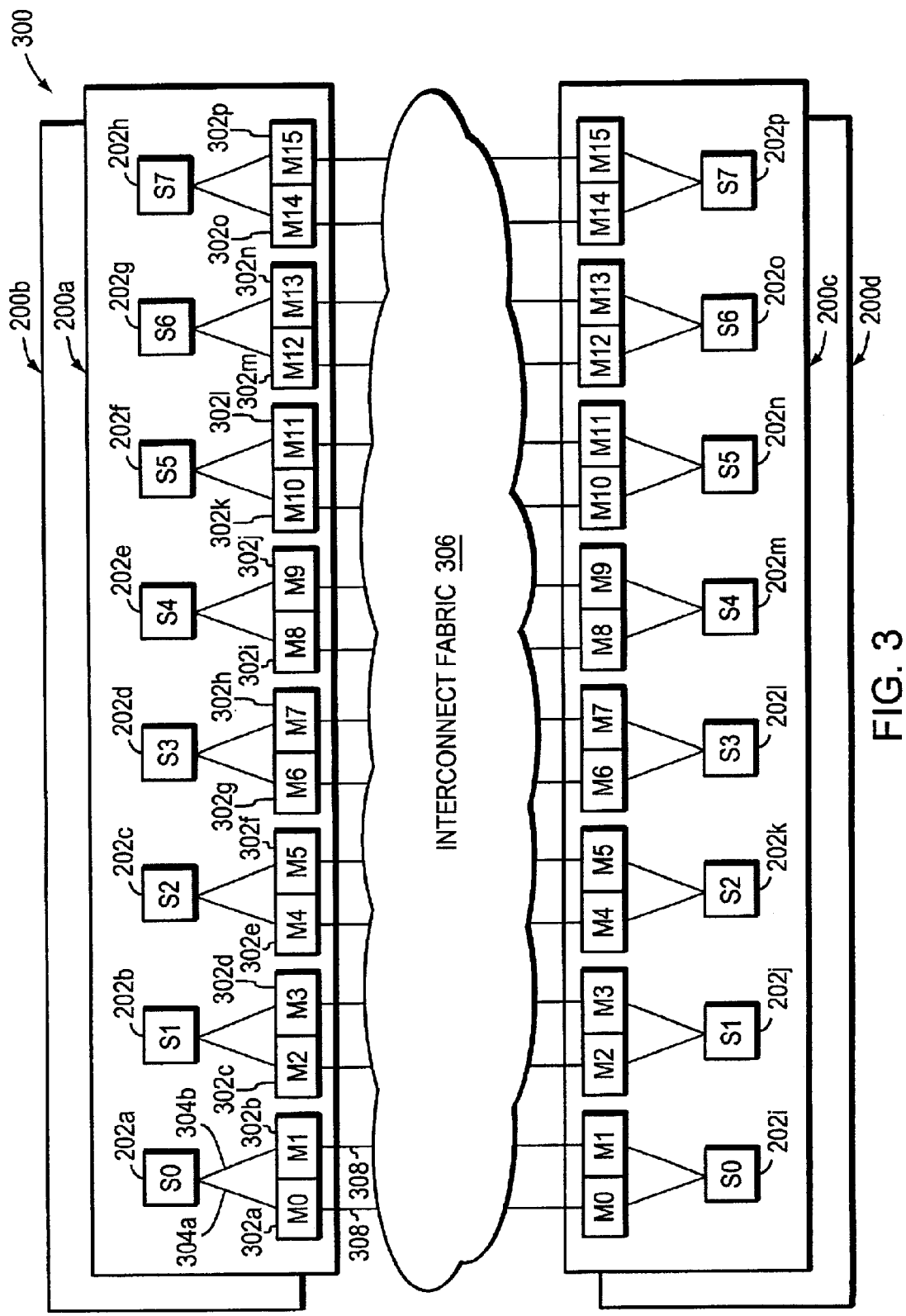
FIG. 3 is a highly schematic functional block diagram of a symmetrical multiprocessor (SMP) computer system formed from a plurality of multi-processor nodes.

FIG. 3 is a highly schematic illustration of a symmetrical multiprocessing (SMP) computer system 300 formed from a plurality of nodes. In particular system 300 comprises four nodes 200a–d, each of which is similar to node 200 (FIG. 2), although the inter-processor links have been omitted for clarity. As described above, each node, such as nodes 200a and 200c, has eight sockets, such as sockets 202a–h and 202i–p, respectively. Each node also includes a plurality of main memory subsystems. Preferably, each socket is coupled to a pair of memory subsystems, thereby providing sixteen memory subsystems at each node. At node 200a, the sixteen memory subsystems M0–M15 are designated by reference numerals 302a–p, and socket 202a is coupled to its pair of memory subsystems 302a and 302b by corresponding processor/memory links 304a and 304b.

The four nodes 200a–d, moreover, are fully interconnected with each other through an interconnect fabric 306. Specifically each memory subsystem, such as subsystems 302a and 302b, are connected to the interconnect fabric 306 by fabric links 308. In the preferred embodiment, each memory subsystem at a given node is coupled to its counterpart memory subsystem at the other three nodes. That is, memory subsystem M0 at node 200a is coupled by four fabric links to the M0 memory subsystem at the three other nodes 202b–d, memory subsystem M1 at node 200a is coupled by four fabric links to the M1 memory subsystem at the other three nodes 202b–d, and so on.

Figure 4:
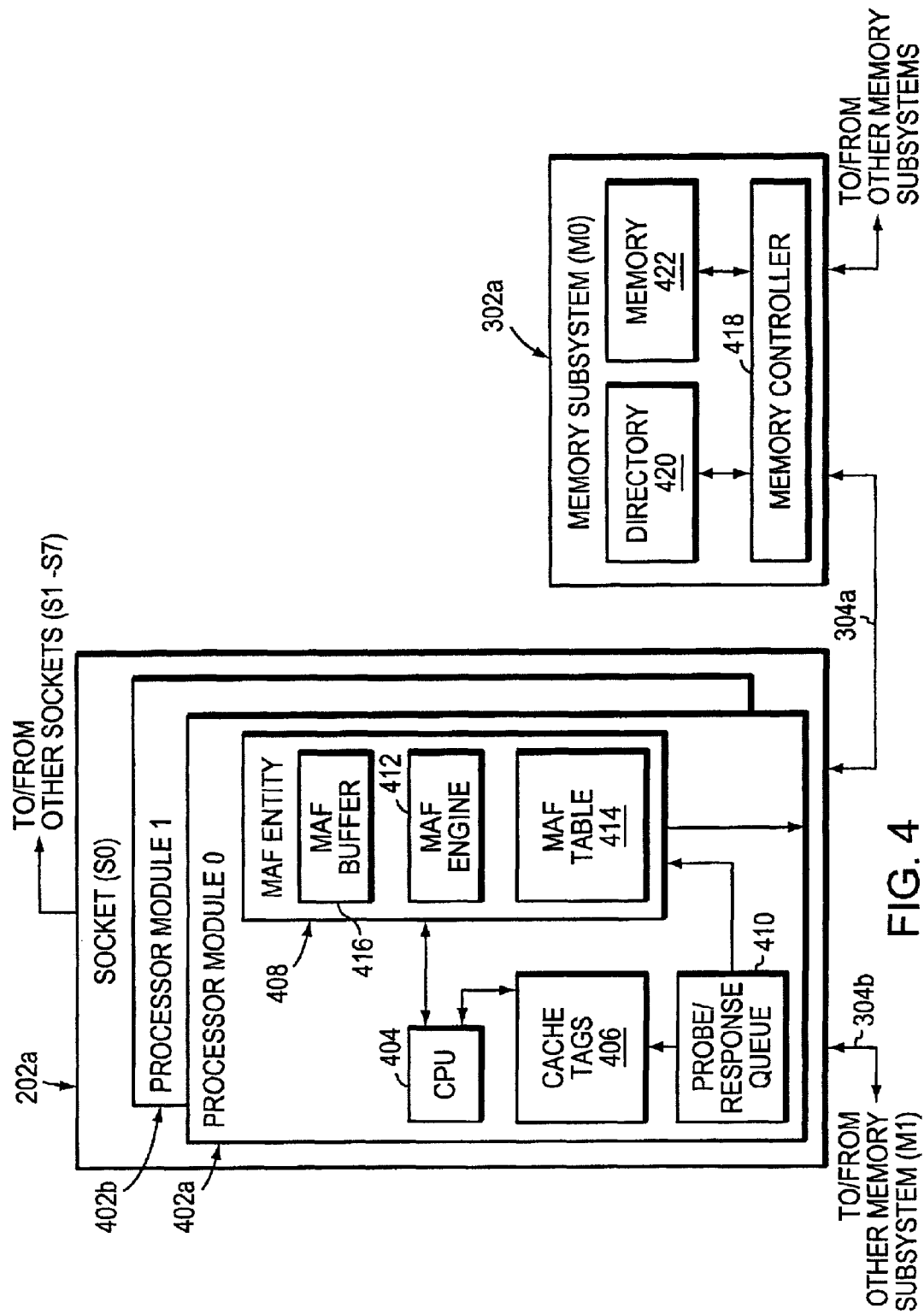
FIG. 4 is a highly schematic block diagram of a processor socket and memory subsystem of the SMP computer system of FIG. 3.

FIG. 4 is a highly schematic illustration of socket (S0) 202a, and one of its associated memory subsystems (M0) 302a. Socket 202a includes two processor modules 402a and 402b. Each processor module, such as module 402a, has a processor or central processing unit (CPU) 404, a cache tags storage device 406, a miss address file (MAF) entity 408 and a probe/response queue 410. The CPU 404 includes one or more processor caches (not shown) at one or more levels that are in close proximity to the CPU for storing data that the CPU 404 is currently using or is likely to use in the near future. The caches are organized into cache lines, and each cache line can store a memory block. Information regarding the status of the memory blocks stored in the processor cache(s), such as the address and validity of the block, is maintained in the cache tags storage device 406.

The MAF entity 408, which keeps track of outstanding commands, such as memory reference requests, issued to the system for memory blocks not presently in the cache, has a MAF engine 412 and a MAF table 414. MAF entity 408 may also include one or more buffers, such as MAF buffer 416. The MAF buffer 416 stores memory blocks received in response to the memory reference requests issued by the CPU 404.

Processor module 402b similarly includes a CPU, a cache tags storage device, a MAF entity and a probe/response queue. Socket (S0) 202a is coupled to the other sockets (S1–S7) of node 200a by inter-socket links and to memory subsystems (M0) 302a and (M1) 302b by processor/memory links 304a and 304b, respectively.

It should be understood that each processor module 402 may include other components, such as a write back or victim buffer, a register file, a translation look-aside buffer (TLB), load/store (L/S) queues, etc.

CPU 404 may be and/or include any one of the processors from the Itanium architecture from Intel Corp. of Santa Clara, Calif., such as the Itanium® 1 or Itanium® 2 processors. Nonetheless, those skilled in the art will understand that other processors, such as the Hammer series of 64-bit processors from Advanced Micro Devices, Inc. (AMD) of Sunnyvale, Calif., may also be used.

The memory subsystem (M0) 302a has a memory controller 418, a directory 420 and one or more memory modules or banks, such as memory unit 422. The memory subsystems of nodes 200a–d combine to form the main memory of the SMP system 300 some or all of which may be shared among the processors. Each socket 202, moreover, includes a portion of main memory by virtue of its respective memory subsystems 302. Data stored at the memories 422 of each subsystem 302, moreover, is organized into separately addressable memory blocks that, as mentioned above, are equivalent in size to the amount of data stored in a processor cache line. The memory blocks or cache lines are of uniform, fixed size, and represent the smallest unit of data that can be moved around the SMP system 300. In the preferred embodiment, each cache line contains 128 bytes of data, although other fixed sizes, such as 64-bytes, could be utilized. Each memory address, moreover, maps to and thus identifies one and only one memory block. And, a plurality of address bits, such as the upper three address bits, are preferably employed to identify the "home" memory subsystem of the respective memory block. That is, each memory block, which is separately addressable by the SMP system 300, has a pre-determined home memory subsystem that does not change. Each directory, moreover, maintains status information for the memory blocks for which its memory subsystem is the home memory. In other words, rather than having a single, centralized directory, the "directory" for the SMP system 300 is distributed across all of the memory subsystems.

Memory unit 422 may be and/or may include one or more conventional or commercially available memory structures, such as dynamic random access memory (DRAM), synchronous DRAM (SDRAM), double data rate SDRAM (DDR-SDRAM) or Rambus DRAM (RDRAM) memory devices, among others.

It should also be understood that each socket 202 may further include one or more input/output (I/O) subsystems (not shown), such as an I/O bridge, that connects one or more I/O devices or peripherals to the SMP system 300. The I/O subsystems, moreover, may have their own private caches for buffering data, and the I/O devices may be granted access to some or all of the SMP system's main memory through the I/O subsystems.

Figure 5:
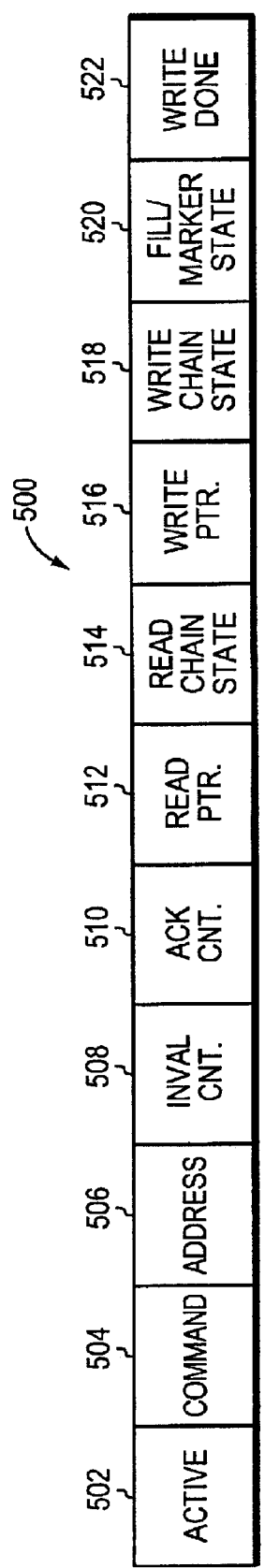
FIG. 5 is a highly schematic block diagram of a miss address file (MAF) entry.

The MAF table 414 is organized at least logically as a table or array having a plurality of rows and columns whose intersections define cells for storing information. FIG. 5 is a highly schematic block diagram of an exemplary row or entry 500 of MAF table 414 (FIG. 4). Entry 500 has a plurality of fields including a 1-bit active field or flag 502, which indicates whether the respective entry 500 is active or inactive, i.e., whether the outstanding request represented by entry 500 is complete or not. A request that is not yet complete is considered active. Entry 500 further includes a command field 504 that specifies the particular command that is outstanding, and an address field 506 that specifies the memory address corresponding to the command. Entry 500 additionally includes an invalid count (Inval Cnt.) field 508, an acknowledgement count (Ack Cnt.) field 510, a read pointer (ptr.) field 512, a read chain field 514, a write pointer field 516, a write chain field 518, a Fill/Marker state field 520 and a write done field 522.

Figure 6:
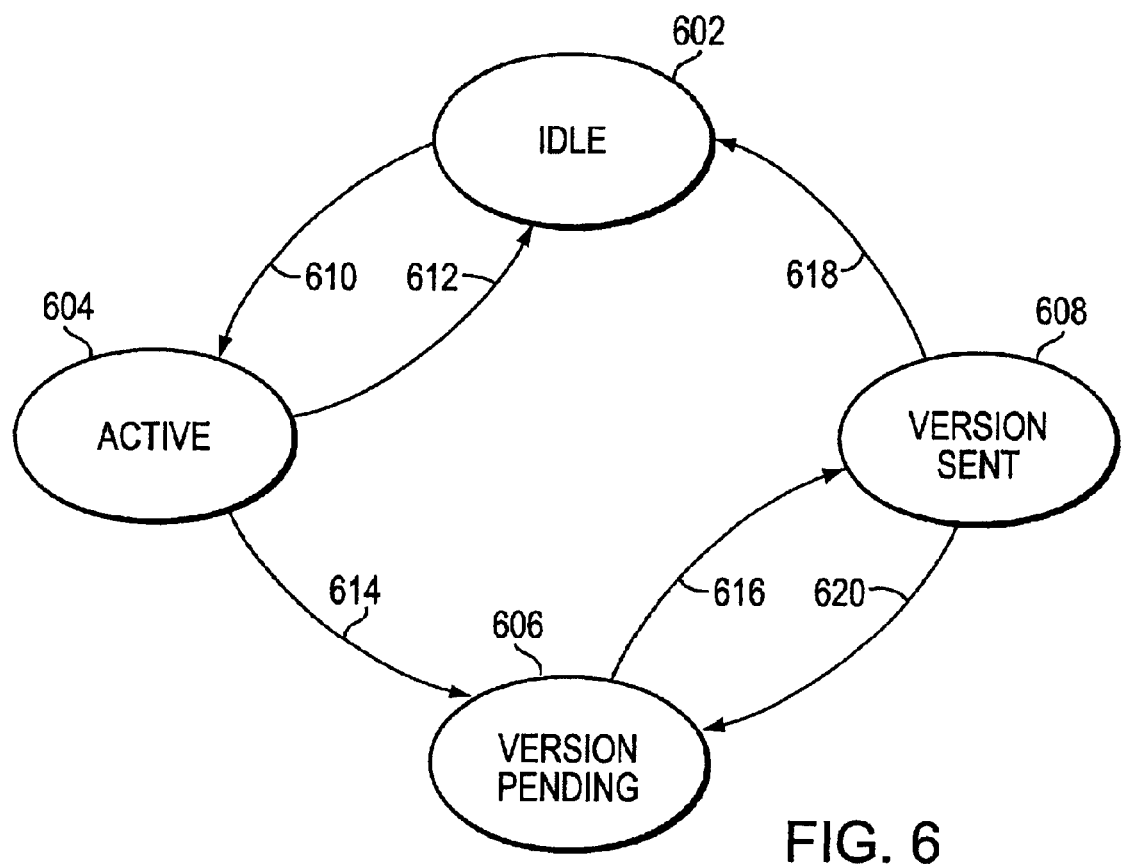
FIG. 6 is a highly schematic illustration of a state diagram.

MAF engine 412, among other things, operates one or more state machines for each entry of the MAF table 414. Specifically, the read chain field 514, the write chain field 518 and the Fill/Marker state field 520 each store a current state associated with the entry. FIG. 6 is state diagram illustrating the Fill/Marker states of a MAF table entry. As indicated, MAF engine 412 transitions each MAF entry among a plurality of Fill/Marker states, including an Idle state 602, an Active state 604, a Version_Pending state 606 and a Version_Sent state 608. An entry's current Fill/Marker state, moreover, is recorded at field 520.

Figure 7:
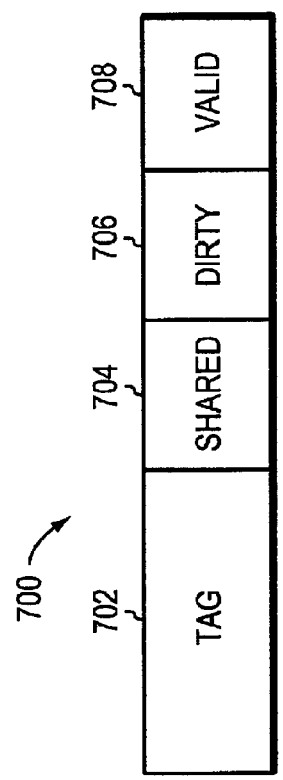
FIG. 7 is a highly schematic block diagram of a cache tag entry.

The cache tags storage device 406 (FIG. 4) is also organized at least logically as a table or array having a plurality of rows and columns whose intersections define cells for storing information. FIG. 7 is a highly schematic block diagram of an exemplary row or entry 700 of the cache tags storage device 406. As mentioned above, each entry of the cache tags storage device 406, including entry 700, corresponds to a particular cache line stored at the processor's cache(s). Cache tag entry 700 includes a tag field 702 that specifies the memory address of the respective cache line, and a series of status flags or fields, including a shared flag 704, a dirty flag 706 and a valid flag 708.

Virtual Channels

A CPU 404, I/O subsystem and memory subsystem 302 of the SMP system 300 may each be referred to generally as an "entity", and the entities of the SMP system 300 interact with each other by issuing "command packets" or simply "commands" to each other. Commands may be classified generally into three types: Requests, Probes and Responses. Requests are commands that are typically issued by a processor when, as a result of executing a load or store operation, it must obtain a copy of data. It should be understood that the term "data" as used herein is broadly defined to include instructions as well as data. Requests are also used to gain exclusive ownership or write access to a piece of data, e.g., a memory block. Requests include Read commands, Read_Modify (ReadMod) commands, Change_to_Dirty (CTD) commands, and Write_Back (WB) commands, among others. Probes are commands issued to one or more processors requesting data and/or cache tag status updates. Probe commands include Forwarded_Read (FRead) commands, Forwarded_Read_Modify (FReadMod) commands, and Invalidate (Inval)

commands, among others. Responses are commands which carry requested data to a processor or acknowledge some request. For Read and ReadMod commands, the responses are Fill and Fill_Modify (FillMod) commands, respectively. For CTD commands, the responses are CTD_Success or CTD_Failure commands. For WB commands, the response may be a WB_Acknowledgement command.

Figure 8:
FIG. 8 is a highly schematic block diagram of a command packet.

FIG. 8 is a highly schematic, partial block diagram of a preferred form of a command packet 800. The command packet 800 is organized into a plurality of fields. Specifically, command packet 800 has a command field 802 which carries an operation code (opcode) indicating the type of command, e.g., Read, ReadMod, Fill, etc., the packet is. An address field 804 specifies the physical address of the memory block to which the command refers. A source identifier (ID) 806 specifies the entity that sourced or issued the command 800. A source MAF entry field 808 specifies the particular entry within the MAF table that has been established at the source entity for the command 800. A destination ID 810 specifies the intended recipient or target of the command 800. An Inval Count field 811 specifies the number of invalidate acknowledgements that are to be received. A version field 812, as described more fully below, can be used to specify a particular version of the memory block being requested. Command may further include a data field 814 for carrying a memory block, and an error correction code (ECC) field 816.

It should be understood that each processor of the system is preferably assigned a unique processor identifier (PID), and that each memory subsystem and I/O subsystem is also assigned a unique ID. For commands issued by a processor, the processor's PID is entered in the source ID field 806. For commands directed to a processor, the target processor's PID is entered in the destination ID field 808. For commands directed to memory, the destination ID field 808 is loaded with the ID assigned to the referenced memory block's home memory subsystem.

Memory reference operations, such as reads, are preferably executed by the SMP system 300 through a series of steps whereby each step involves the exchange of a particular command among the entities of the SMP system 300.

To avoid deadlock, the cache coherency protocol of the present invention utilizes a plurality of channels established within the SMP system 300. Preferably, the channels share physical resources and are thus "virtual" channels. Each virtual channel, moreover, is assigned a specific priority relative to the other virtual channels so that, by appropriately assigning the different command types to different virtual channels, the SMP system 300 can also eliminate flow dependence. In general, commands corresponding to later steps in a series are assigned to higher priority virtual channels than the commands corresponding to earlier steps.

In accordance with the present invention, the SMP system 300 maps commands into at least three (3) different virtual channels. A Q0 channel carries processor command packet requests for memory space read and write transactions. A Q1 channel accommodates probe command packets to Q0 requests. A Q2 channel carries response command packets to Q0 requests.

A suitable mechanism for implementing virtual channels in a large SMP system is described in U.S. Pat. No. 6,014,690, issued Jan. 11, 2000 for EMPLOYING MULTIPLE CHANNELS FOR DEADLOCK AVOIDANCE IN A CACHE COHERENCY PROTOCOL, which is hereby incorporated by reference in its entirety.

Those skilled in the art will recognize that other and/or additional virtual channels could be defined. The three virtual channels described above, moreover, can be configured to carry other types of command packets. The Q0 virtual channel, for example, may also accommodate processor command request packets for programmed input/output (PIO) read and write transactions, including control status register (CSR) transactions, to input/output (I/O) address space. Alternatively, a QIO virtual channel having a priority below the Q0 virtual channel can be defined to accommodate PIO read and write transactions.

In the illustrative embodiment, the processors and memory subsystems of the SMP 300 system cooperate to execute a write-invalidate, ownership-based cache coherency protocol. "Write-invalidate" implies that when a processor wishes to modify a cache line, it causes copies of the cache line that may be located in other processors' caches to be invalidated, rather than updating them with the new value. "Ownership-based" implies there is always an identifiable owner for a cache line, whether it is memory, an I/O subsystem or one of the processors of the SMP system 300. The owner of a cache line, moreover, is responsible for supplying the most up-to-date value upon request. A processor may own a cache line "exclusively" or "shared". If a processor has exclusive ownership over a cache line, it may modify or update the cache line without informing the system. Otherwise, it must inform the system and potentially invalidate copies located in other processors' caches.

Directory 420, like the MAF, is also organized at least logically as a table or array having a plurality of rows and columns whose intersections define cells for storing information. FIG. 9 is a highly schematic block diagram of directory 420. Directory 420 is preferably organized into two regions or areas, a main directory region 902 and a write-back directory region 904. A plurality of rows 906–910 span both regions 902 and 904 of the directory 420. Several versions of row 906, which are described below, are shown. Within each region 902 and 904, a plurality of columns are defined for specifying the type of information stored in the directory's entries. The main directory region 902, for example, has an owner/sharer column 914 for storing the identifier (ID) assigned to the entity that owns the cache line, and a sharer list column 916 for indicating which entities, if any, have a shared copy of the cache line.

The sharer list column 916 is preferably configured to operate in one of two different modes. In a first mode, sharer list column 916 is organized into two sharer columns 916a and 916b each of which can store the ID assigned to a single entity, such as a processor, of the SMP system 300 that has a shared copy of the respective cache line. If a third entity is to be added as a sharer, the sharer list column 916 converts from two sharer columns 916a and 916b to a single coarse sharer vector column 916c. Each bit of the sharer vector column 916c corresponds to and thus identifies a set of one or more sockets 202 of system 300. If a bit is asserted, then at least one processor located within the set of sockets associated with the asserted bit has a copy of the respective cache line. The set of sockets may or may not correspond to a node. Entries 907 and 909 illustrate the first mode, and entries 908 and 910 illustrate the second mode. Main region 902 further includes an unused column 918 and an error correction code (ECC) column 920 for storing an ECC value calculated for the data in fields 914–918.

The write-back region 904 has a writer column 922, an unused column 924 and an ECC column 926. As explained herein, the contents of the owner/sharer column 914 of the main region 902 together with the contents of the writer column 922 of the write-back region 904 determine who owns the respective cache line and thus where the most up-to-date version is located within the SMP system 300. The ECC column 926 stores an ECC value calculated for the data in fields 922 and 924.

The unused fields 918 and 924 are provided in order to support modifications to the protocol and/or increases in the size of the address or other fields. It should be understood that one or more bits of unused column 914 may be used to signify whether the corresponding entry's sharer list 916 is in individual sharer mode, i.e., fields 916a and 916b, or in coarse sharer vector mode, i.e., sharer vector field 916c.

In the preferred embodiment, directory 420 is actually located within the memory unit 422 itself along with the memory blocks, and is not a separate memory component. That is, each memory address indexes to an area of the memory device 422 that is preferably divided into three regions. The first region corresponds to the main directory region, the second region corresponds to the write-back region, and the third region corresponds to the data contents of the memory block.

In the illustrative embodiment, the owner/sharer field 914 is 10-bits, the sharer list field 916 is 16-bits, thereby supporting either two 8-bit sharer IDs or one 16-bit coarse sharer vector, and the unused and ECC fields 918, 920 are each 7-bits. The main directory region 902 of a memory area is thus 5-bytes. For the write-back region 904, the writer field is 9-bits, the unused field 924 is 1-bit and the ECC field 926 is 6-bits, thereby making the write-back region 2-bytes. The third region includes the cache line, which may be 128-bytes, and a 9-byte FCC field (not shown) calculated for the memory block for a total of 137-bytes. Accordingly, for each memory block, the memory area comprises 144-bytes of information in total.

As mentioned above, each CPU 404 of the SMP system 300 may access portions of memory stored at the two memory subsystems 302 coupled to its socket, i.e., a "local" memory access, or at the memory subsystems coupled to any other socket of the SMP system 300, i.e., a "remote" memory access. Because the latency of a local memory access will differ from the latency of a remote memory access, the SMP system 500 is said to have a non-uniform memory access (NUMA) architecture. Further, since the system 300 provides coherent caches, the system is known as a cache-coherent NUMA (CC-NUMA) system.

Operation of the Distributed Directory

Each memory subsystem 302 preferably includes a built-in, self test (BIST) engine (not shown) that is used during initialization of the subsystem. The BIST engine initializes the contents of the memory device 422, including the directory contents and ECC values, by setting them to predetermined values as one of the final steps of the self test. It should be understood that firmware, rather than or in addition to a BIST engine, may be used for initialization purposes.

As data is brought into the SMP system 300, it is loaded into the memory devices 422 of the memory subsystems 302 in units of memory blocks. As each memory block is stored at a memory subsystem 302, the memory controller 418 computes a first error correction code (ECC) value for the block which is stored along with the cache line as described above. Data may be brought into the memory subsystems 302 from any number of sources, such as floppy disk drives, hard disk drives, tape drives, optical or magneto-optical drives, scanners, sound cards, etc. The memory controller 418 also loads the owner/sharer field 914 in the main region 902 and the writer field 922 in the write-back region 904 with the same value, preferably the ID assigned to the memory subsystem. The remaining fields of each entry are preferably de-asserted and/or set to null, e.g., to zero. The memory controller 418 also computes a second ECC value for the information in the main directory region 902, and a third ECC value for the information in the write-back region 904. The second ECC value is stored in ECC field 920 while the third ECC value is stored in ECC field 926. Entry 906a illustrates how a directory entry would appear upon initialization of the memory subsystem.

Read Command

Suppose a processor, e.g., processor P0, of the SMP system 300 wishes to read a memory block that is not present in its cache. Processor P0 preferably issues a Read command on the Q0 virtual channel specifying the address of the desired memory block. Processor P0 also directs MAF entity 416 to create an entry in the MAF table 414 for this request. MAF entity 416 asserts the active flag 502, loads the command field 504 with the opcode associated with a Read command and enters the block's address in the address field 506. MAF engine 412 transitions the state associated with the entry and reflected in Fill/Marker state field 520 from the Idle state 602 (FIG. 6) to the Active state 604, as indicated by arrow 610. The remaining fields of the MAF entry 500 may be de-asserted. The SMP system 300 routes the Read command from processor P0 to the home memory subsystem for the specified memory block, e.g., subsystem 302a.

At the home memory subsystem 302a, the memory controller 418 accesses the area of memory device 422 specified by the address contained in the Read command, and retrieves the directory entry, e.g., entry 906a, for the block. The memory controller 418 first examines the information stored in the owner/sharer field 914 and the writer field 922 of the identified entry 906a. Because the contents of both the owner/sharer field 914 and the writer field 922 are the same, i.e., memory, the memory controller 418 concludes that it is the owner of the cache line, and that the version stored at its memory device 422 is the most up-to-date version. Accordingly, the memory controller 418 responds to the Read command by sending processor P0 a copy of the block from memory device 422.

Specifically, the memory controller 418 issues a Fill command on the Q2 virtual channel that includes the address and data of the requested block. The memory controller 418 also adds P0's PID to the list of sharers maintained in the sharer column 916. Assuming P0 is the first entity to request a shared copy of the cache line, memory controller 418 enters P0's PID into sharer field 916a. As P0 has only requested a shared copy of the cache line, the memory controller 418 does not modify the contents of the owner/sharer field 912. The memory controller 418 also does not modify the contents of the writer field 922. Entry 906b (FIG. 9) illustrates how entry 906a would appear following the updates performed by the memory controller 418 in response to the Read command from P0.

It should be understood that, when a memory block is read out of a memory device 422, the memory controller 418 preferably checks parity information, e.g., a parity bit, to determine whether the retrieved data has been corrupted. If so, the memory controller 418 utilizes the previously computed ECC value to recover the data. The recovered data is then sent to the requesting entity. The recovered data may also be loaded back into the memory device 422, overwriting the corrupted data. Controller 418 also checks a parity bit when reading information from the main directory region 902. And, if the information in the main directory region 902 is updated, such as by adding P0 to the sharer list 916, the memory controller 418 computes a new ECC value and stores it in ECC field 920.

In some SMP systems that use ordered Q1 commands, a fill marker mechanism is employed to inform a processor that its request, such as a Read command, has accessed the home memory's directory, and that the requested data is in the process of being returned to the processor. Typically, the fill marker mechanism is implemented through the issuance of a separate Marker command by the memory subsystem to the processor upon access to the directory. In the illustrative embodiment, memory controller 418 does not send a separate Marker command message in response to Read commands. Nonetheless, those skilled in the art will recognize that a fill maker mechanism could be implemented by SMP system 300.

At processor P0, the Fill command is received at the probe/response queue 410, and the MAF engine 412 retrieves the entry from MAF table 414 corresponding to the received Fill command. The MAF engine 412 transitions the state reflected in the Fill/Marker state field 520 from the Active state 604 to the Idle state 602, as indicated by arrow 612, and the matching entry is rendered inactive by de-asserting the active flag 502. The data included with the Fill command is loaded into P0's cache and the respective entry 700 of the cache tags storage device 406 is up-dated. Specifically, the tag field 702 is loaded with the address of the received block, the shared and valid flags 704 and 708 are asserted and the dirty flag 706 is de-asserted.

ReadMod Command

Suppose that, instead of wanting just read access to a cache line, processor P0 wishes to obtain write access over a cache line that is not present in its cache.

In this case, processor P0 preferably issues a Read_Modify (ReadMod) command on the Q0 virtual channel specifying the address of the desired cache line. Processor P0 also directs MAF entity 416 to establish an entry in the MAF table 414 for the outstanding ReadMod command. MAF entity 416 asserts the active flag 502, loads the command field 504 with the opcode associated with a ReadMod command, and enters the address of the block in the address field 506. In addition, MAF entity 416 transitions the state as reflected in Fill/Marker state field 520 from the Idle state 602 to the Active state 604. The remaining fields of the MAF table entry 500 may be de-asserted. System 300 routes the ReadMod command from processor P0 to the block's home memory subsystem 302a.

At memory subsystem 302a, the memory controller 418 accesses the area specified by the address of the ReadMod command, and retrieves the corresponding directory entry, i.e., entry 906a. The memory controller 418 first examines the information stored in the owner/sharer field 914 and the writer field 922 of the identified entry 906a. Because the contents of both the owner/sharer field 914 and the writer field 922 are the same, i.e., they both indicate memory, the memory controller 418 concludes that it is the owner of the block, and that the version stored at its memory 422 is the most up-to-date version. The memory controller 418 also checks the sharer column 912 to see whether any other entities have a shared copy of the requested cache line. In this case, no entities have a shared copy of the cache line. Accordingly, the memory controller 418 responds to the ReadMod command by sending processor P0 a copy of the block from its memory device 422.

Specifically, the memory controller 418 issues a Fill_Modify (FillMod) command on the Q2 virtual channel that includes the address and data of the requested block. Because P0 is requesting write access to the block, the memory controller 418 inserts P0's PID into the entry's owner/sharer field 914 replacing the current value, i.e., memory. Nonetheless, the memory controller 418 does not modify the contents of the entry's writer field 922. Entry 906c (FIG. 9) illustrates how entry 906a would appear following the updates performed by the memory controller 418 in response to the ReadMod command from P0.

If, at the time the ReadMod command is received at the memory controller 418, the sharer column 912 of entry 906a indicated that one or more entities have a shared copy of the block, the memory controller 418 would issue an Invalidate (Inval) command on the Q1 virtual channel to each such entity directing them to invalidate their copies of the block. Supposing there were two such entities, the memory controller 418 would also have set an invalid count within the FillMod command to two. When the FillMod command is received at P0, the corresponding MAF entry is located and the Inval Count field 508 is set to two as specified by the FillMod command.

In response to the Inval commands from the memory controller 418, the other entities invalidate their copies of the cache line and send Invalid_Acknowledgement (IAck) commands on the Q2 virtual channel to P0. In response to each IAck command, P0 increments the Ack Count field 510 of the respective MAF entry 500 by one. The MAF engine 412 continuously checks the values of the Inval Count and Ack Count fields 508 and 510. When the two values are the same, indicating that each and every entity that had a shared copy of the cache line has invalidated its copy, P0 considers the block to be consistent and available to it for processing.

Suppose, after granting P0 write access over the block, another processor, e.g., processor P1, issues a Read command for the block. The Read command is routed by the SMP system 300 to memory subsystem 302a which is the block's home memory. The memory controller 418 locates the directory entry, i.e., entry 906c, corresponding to this cache line and examines the information stored in the owner/sharer field 914 and the writer field 922 of the identified entry 906a. As the owner/sharer field 914 indicates P0 and the writer field 922 indicates memory, the two values are not the same. In this case, the memory controller 418 concludes that the entity specified in the owner/sharer field 914, i.e., P0, rather than the memory subsystem itself, is the owner and has the most up-to-date version of the block. Accordingly, the memory controller 418 issues a Forwarded_Read (FRead) command on the Q1 virtual channel to P0. The memory controller 418 updates the sharer list column 916 for this directory entry to reflect that processor P1 has a shared copy of the block. The memory controller 418 does not, however, modify either the owner/sharer field 914 or the writer field 922. Entry 906d (FIG. 9) illustrates how entry 906c would appear following the updates performed by the memory controller 418 in response to the Read from P1.

P0 responds to the FRead by sending a copy of the block from its cache to P1 on the Q2 virtual channel.

ReadMod Command with Other Processor as Owner

Suppose a third processor, P2, now issues a ReadMod command for this same memory block. The ReadMod is routed by the SMP system 300 from processor P2 to memory subsystem 302a which is the block's home memory. The memory controller 418 accesses the area of memory device 422, and retrieves the directory entry, i.e., entry 906d, corresponding to the block. Controller 418 then examines the information stored in the entry's owner/sharer field 914 and writer field 922. As the two values are not the same, the memory controller 418 concludes that P0, rather than the memory subsystem itself, is the owner and thus has the most up-to-date version of the block. Memory controller 418 also examines the sharer list column 916 and determines that P1 has a shared copy of the block. In this case, the memory controller 418 issues a Forwarded_Read_Modify (FReadMod) command on the Q1 channel to P0, and an Inval command on the Q1 channel to P1. In the illustrative embodiment, the FReadMod command also carries an inval count of two. The memory controller 418 also updates the directory entry to reflect that P2 is now the owner/sharer of the block and that there are no sharers. The memory controller 418 does not modify the writer field 922. Entry 906e (FIG. 9) illustrates how entry 906d would appear following the updates performed by the memory controller 418 in response to the ReadMod command from P1.

In response to the FReadMod command, P0 issues a FillMod command that includes the block on the Q2 virtual channel to P2. The FillMod command preferably has an Inval Count of two, reflecting that there are two entities with a copy of the cache line, i.e., P0 and P1. P0 also invalidates its copy of the cache line by de-asserting the cache tag entry's valid flag 708, and sends P2, either individually or as part of the FillMod command, an IAck command on the Q2 channel. In response to the Inval command, P1 also invalidates its copy of the cache line and sends an IAck command to P1. As each IAck command is received at P1, its MAF engine 412 increments the Ack Count field 510 of the corresponding MAF entry 500 by one. When the Inval Count and Ack Count fields 508 and 510 are equal, the cache line is considered to be consistent and may be processed, e.g., read and/or modified, by P2.

Write Back Command

When P2 is finished with the cache line, it writes the cache line back to its home memory subsystem 302a in order to make room in its cache for other cache lines. In the illustrative embodiment, the processor module 402a (FIG. 4) does not include a separate write-back or victim buffer. Instead, a cache line that is being victimized from the processor's cache is written-back to memory directly from the cache.

When a processor, such as P2, wishes to write-back a cache line over which it has write access, it first checks the corresponding tag entry 700. Specifically, P2 confirms that the dirty flag 706 and the valid flag 708 are both asserted, thereby indicating that P2 is the owner of the cache line to be written back and that the cache line is still valid. Only those memory blocks that were acquired by a processor with a request for exclusive or write access may subsequently be written back to main memory. If the dirty flag 706 is not asserted and/or the cache line is invalid, P2 is precluded from writing the cache line back to memory. P2 also checks its MAF table 414 to see if a MAF entry 500 already exists for the cache line to be written back. If there is a MAF entry 500, P2 confirms that the entry is inactive, that there are no outstanding IAcks for the cache line, i.e., that the Inval Count field 508 equals the Ack Count field 510, that the read pointer and write pointer fields 512 and 516 are both invalid, and that the Fill/Marker state field 520 is set to the idle state. If there are one or more outstanding IAcks or the MAF entry is active, the processor is precluded from writing the cache line back to memory.

Assuming the cache line is valid and dirty, and that MAF entry satisfies the above checks, a processor, such as P2, simply issues a Write_Back (WB) command to main memory in order to write the block back to memory. The WB command, which includes the modified block and its address, is preferably issued on the Q2 virtual channel. The tag entry 700 may then be invalidated and the entry made available to store a new cache line. No copy of the cache line being written back is kept at processor P2 upon issuance of the WB command. In the preferred embodiment, the processor P2 also creates a new entry 500 in the MAF table 414 for the WB command. The processor P2 asserts the active field 502, enters the opcode associated with the WB command into the command field 504 and enters the block's address into the address field 506.

The WB command is routed by the SMP system 300 to the block's home memory subsystem 302a. At the memory subsystem 302a, the memory controller 418 responds to the WB command by storing the modified data appended to the WB command in memory device 422 overwriting the previous contents of the memory block. The memory controller 418 also updates the directory entry's write-back region 904. Specifically, the writer field 922 of the directory entry, i.e., entry 906e, for the block being written back is updated with the PID of the processor that issued the WB command, i.e., processor P2. Significantly, neither the memory controller 418 nor the processor make any change to the directory entry's owner/sharer field 914. Entry 906f (FIG. 9) illustrates how entry 906e would appear following the write-back operation by P2.

In addition to storing the modified data at the memory device 422, the memory controller 418 preferably computes a new ECC value for the data and stores this new ECC value along with the block. Furthermore, because it has changed the contents of the write-back region 904, the memory controller 418 also computes a new ECC value for the information in region 904 and stores this new value in the ECC field 926.

After updating the entry's writer field 922, the memory controller 418 returns a WB_Acknowledgement (WB Ack) command to P2. The WB_Ack is preferably issued on the Q2 virtual channel, although it may alternatively be issued on the Q1 virtual channel. In response to receiving the WB_Ack command, P2 causes the MAF entry 700 that was created for the WB command to be deactivated, e.g., by de-asserting the active field 502.

Suppose that, following P2's write-back of the block, some other processor in the SMP system 300, e.g., processor P3, now issues a Read command for the block. As described above, the Read command is routed by the SMP system 300 to the block's home memory subsystem 302a. The memory controller 418 responds to the Read command by accessing the directory entry, i.e., entry 906f, for the block. The memory controller 418 compares the contents of the owner/sharer field 914 with the contents of the writer field 922. Because the WB command from P2 modified the writer field 922 but not the owner/sharer field 914, the values in the two fields are now the same, i.e., they both contain P2's PID. As the values stored in the two fields 914, 922 are the same, the memory controller 418 concludes that it is the owner of the requested block, and that it has the most up-to-date version in its memory device 422. Controller 418 reaches this conclusion even though the owner/sharer field 914 does not indicate memory as the owner of the block. Because the two fields 914, 922 contain the same value, the memory controller 418 responds to the Read command from processor P3 by issuing a Fill command on the Q2 channel which includes a copy of the block taken from its memory device 422. The memory controller 418 also updates the directory entry by adding P3 to the sharer list field 916. The memory controller 418 does not modify either the owner/sharer field 914 or the writer field 922. Entry 906g (FIG. 9) illustrates how entry 906f would appear following the Read command from processor P3.

Except for the condition noted below, the writer field 922 of the directory's write-back region 904 is only modified in response to a WB command from a processor (or other system entity) performing a write-back of data to memory. The WB command, moreover, does not result in the contents of the owner/sharer field 914 being read or modified. The memory controller 418, moreover, updates the contents of a directory entry immediately in response to the received command, e.g., Read command, ReadMod command, WB command, etc. Such updates are not dependent upon the memory controller 418 receiving additional information, such as ACKs, from system entities.

It should be understood that write-backs must be strictly serialized. That is, at any point in time, the cache coherency protocol ensures that only a single processor can issue a WB command for a given memory block. In the illustrative embodiment, this is accomplished by permitting only a single entity to have write or exclusive access to a given memory block. A second entity requesting write access over the given memory block is not granted such access until the previous owner has either been invalidated or has written the memory block back to main memory. Accordingly, at any given point in time, the cache coherency protocol permits only a single entity to issue a WB command for a given memory block.

As shown, the processors 404 and directories 426 cooperate to execute a generalized low occupancy cache coherency protocol. The protocol is "generalized" in that it can support processors that share memory blocks that are in the dirty state as well as processors that are precluded from sharing memory blocks that are in the dirty state. A dirty-shared processor responds to a snoop read, e.g., a FRead command, identifying a block in the dirty state by sending a copy of the block from its cache to the source of the snoop read. The dirty-shared processor does not, in response to the snoop read, write a copy of the block back to main memory. Accordingly, multiple processors may have a "dirty" copy of a memory block, although only one processor, the owner, can write the block back to main memory. Non-dirty shared processors do not support dirty blocks being held in more than one cache. In particular, if a non-dirty shared processor receives a snoop read identifying a block in the dirty state, the processor typically writes the block back to main memory, thereby requiring the source of snoop read to obtain a copy of the block from memory. Alternatively, the non-dirty shared processor may return the dirty block to main memory but also forward a copy of the block from its cache to the source of the snoop read. As described in co-pending application Ser. No. 10/263,741, filed Oct. 3, 2002 and titled COMPUTER SYSTEM SUPPORTING BOTH DIRTY-SHARED AND NON-DIRTY-SHARED DATA PROCESSING ENTITIES, which is hereby incorporated by reference in its entirety, the illustrative cache coherency protocol supports both types of processors.

The protocol is also considered a "low occupancy" protocol, because of the following attributes. First, each command only has to access the directory 426 once. Second, directory changes are deterministic based on the current directory state and the type of the received command. That is, the resulting state or form of a directory entry is solely a function of the current state or form of the entry and the received command. Third, the directory 426 neither creates nor requires any transient states or the return of acknowledgements in order to maintain coherency. Accordingly, once the directory 426 has updated the appropriate fields and issued the required commands, e.g., ReadMods, Invals, etc., it can immediately process another command for the same memory block even though the previous commands have yet to reach their targets.

Preferably, the SMP system 300 does not include a single, total ordering point for all references issued to the shared memory. Each directory 420, however, represents or provides a local serialization point for requests directed to the memory blocks of the respective memory subsystem 302. That is, as indicated above, the memory controller 418 imposes a serial order on all requests to the same memory block. To improve efficiency, the memory controller 418 may be configured to process requests to different memory blocks simultaneously or substantially simultaneously, e.g., through the use of multiple, interleaved memory banks.

In accordance with the preferred embodiment of the present invention, the virtual channels, i.e., the logic, fabric links, and other resources on which the virtual channels are built, must guarantee delivery of all commands within the SMP system 300. The cache coherency protocol assumes that all commands issued in connection with a memory reference operation will be received by their intended targets.

Late Race Condition

With the provision of a generalized low occupancy cache coherency protocol, however, it is possible that race conditions over a given memory block may arise within the SMP system 300.

FIGS. 10A–G illustrate the retry-based mechanism of the present invention for resolving late race conditions.

Referring to FIG. 10, suppose that a processor, e.g. processor P2 also designated by reference numeral 404a, issues a ReadMod command 1002 for a specified memory block. The ReadMod command 1002 is routed to the home memory subsystem, e.g. memory subsystem 302h having a directory 420 and one or more memory devices (MEM) 422. The memory controller 418 (FIG. 4) accesses the directory entry, e.g., entry 912a (FIG. 10A) for the specified memory block. Directory entry 912a indicates that memory is both the owner and last writer of the specified memory block. Accordingly, the memory controller 418 issues a FillMod command 1004 to processor P2 and updates the directory entry by inserting P2's PID in the owner field 914. Entry 912b (FIG. 10A) illustrates how entry 912a would appear following the completion of the ReadMod command 1002 from processor P2. Now, suppose another processor, e.g., processor P3 also designated by reference numeral 404b, issues a memory reference operation, such as Read command 1006, for the same memory block to which processor P2 obtained write access.

To keep track of the outstanding Read command 1006, P3's MAF entity 408 creates a new MAF entry in its MAF table 414. Processor P3 asserts the active field 502 of entry 500a, specifies the opcode associated with the outstanding command, i.e., Read, in the command field 504, and enters the physical memory address in address field 506. Fields 508–520 and 522 are each set to zero. The MAF entity 408 (or engine 412) transitions the state of new entry from the Idle state 602 to the Active state 604 upon issuance of the Read command, and records the current state in the entry's Fill/Marker state field 520.

The Read command 1006 from processor P3 is also routed to memory subsystem 302h, and the memory controller 418 accesses the directory entry, i.e., entry 912b. Directory entry 912b indicates processor P2 as the current owner and memory as the last writer. As the two fields 914, 922 contain different values, the memory controller concludes that processor P2, whose PID is stored in the owner/sharer field 914, is the current owner of the memory block.

Figure 10A:
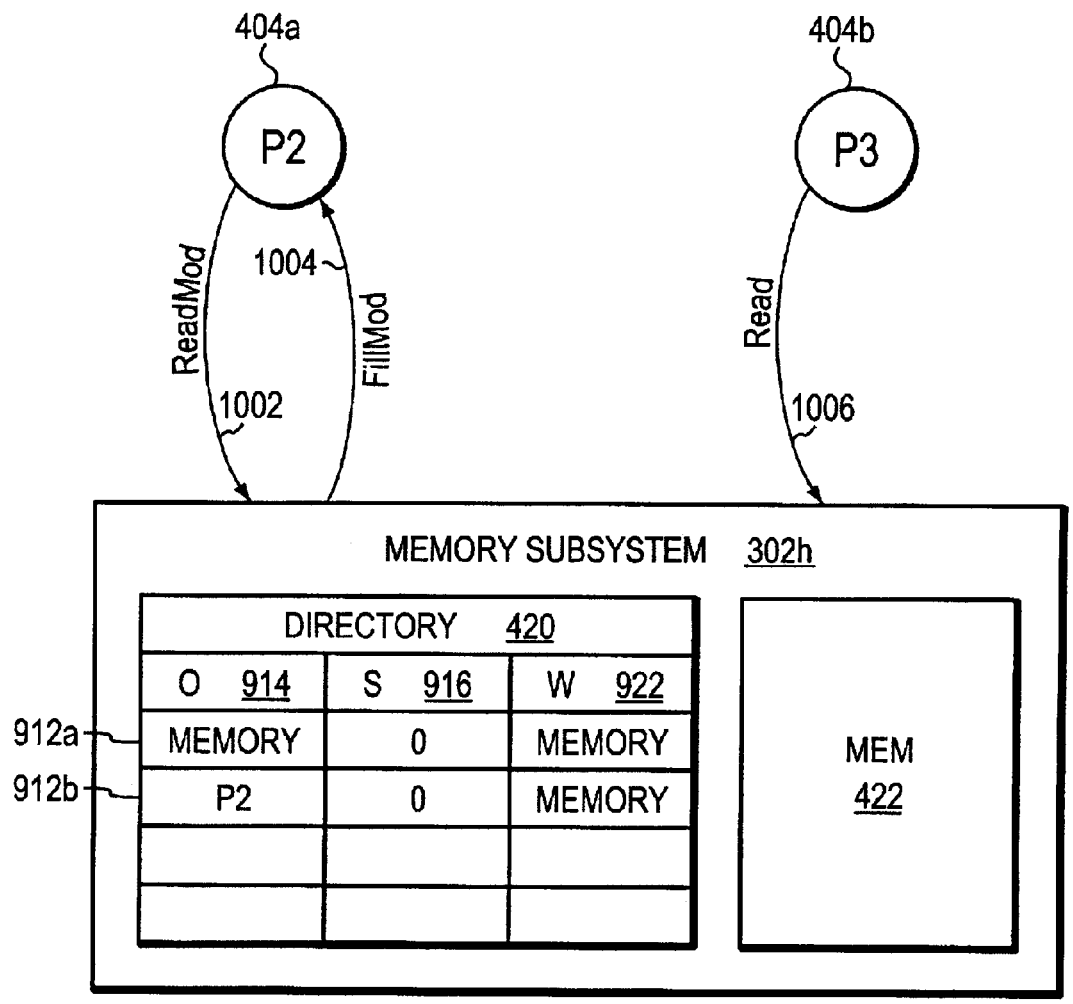
FIGS. 10A–G illustrate an exemplary exchange of command packets between a plurality of processors and a memory subsystem.
Figure 10B:
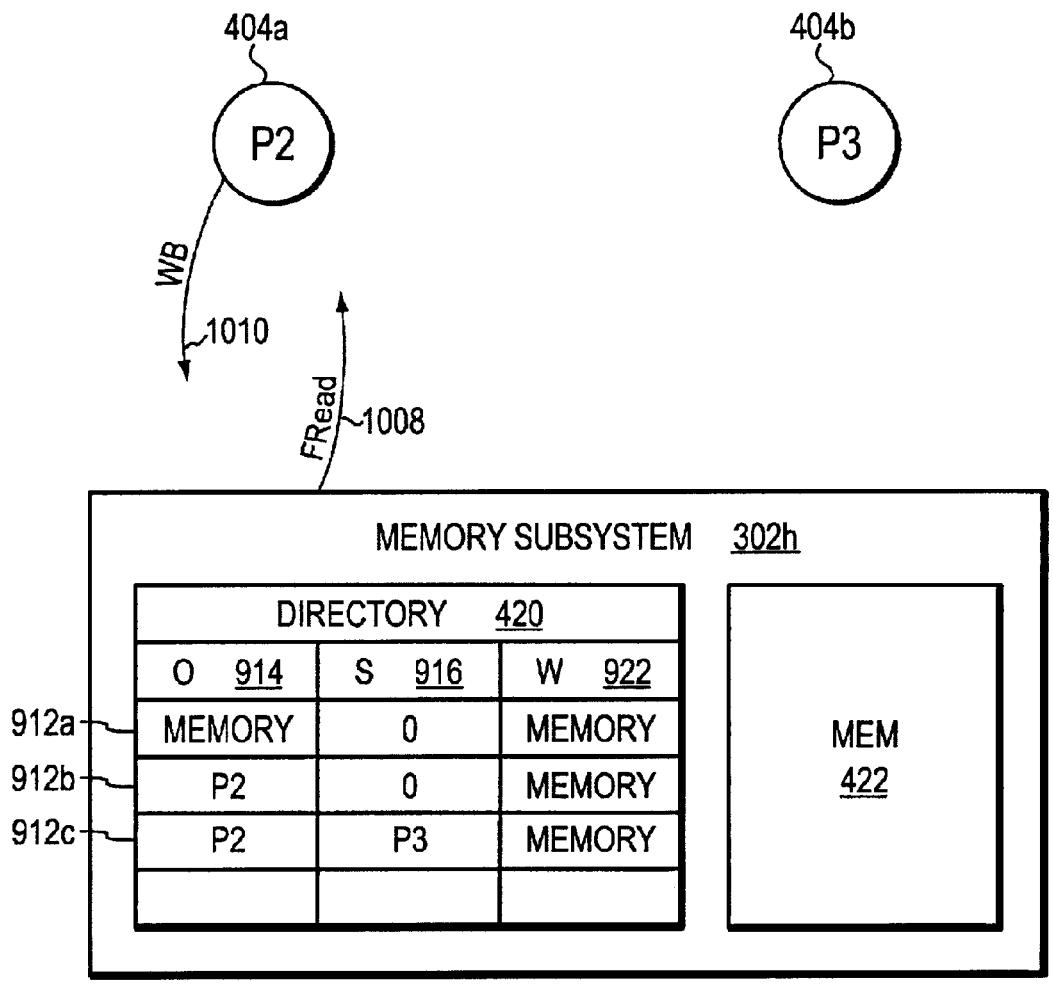
Figure 10C:
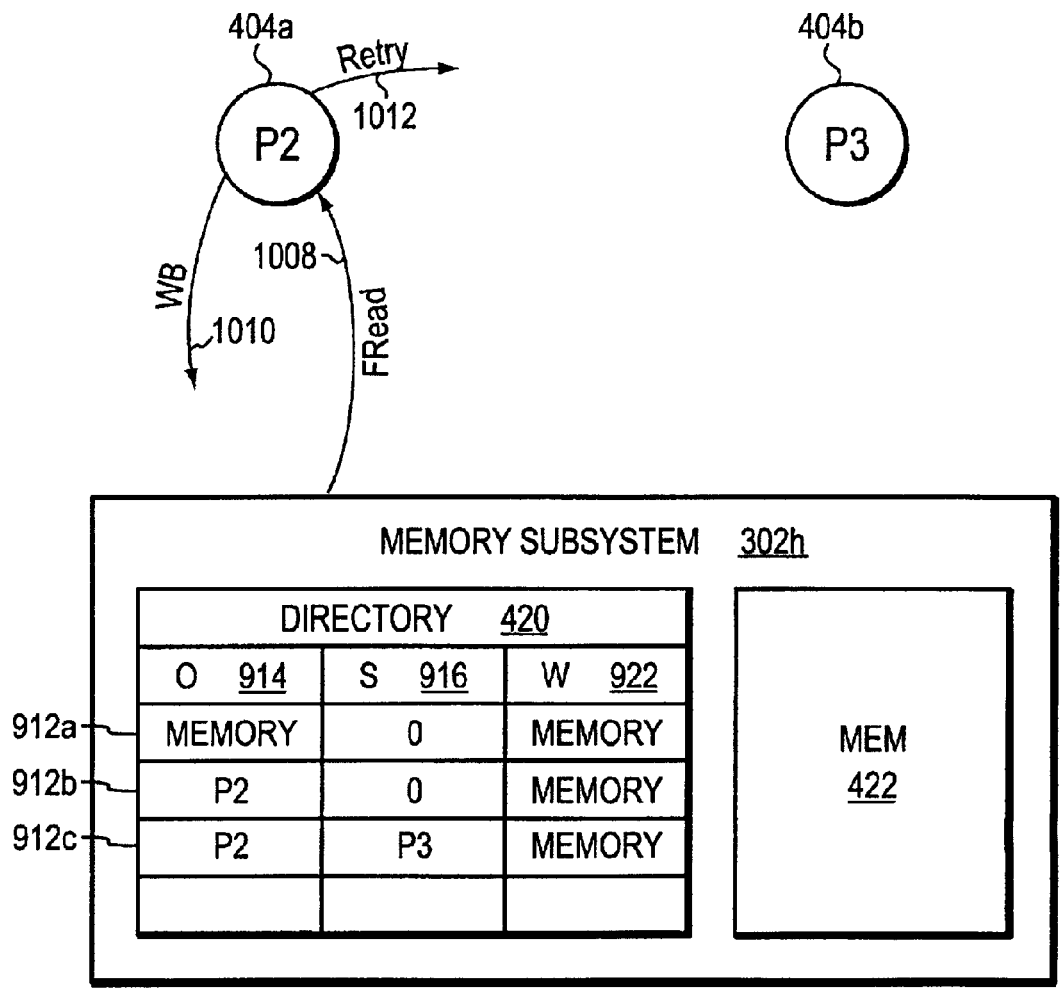
Figure 10D:
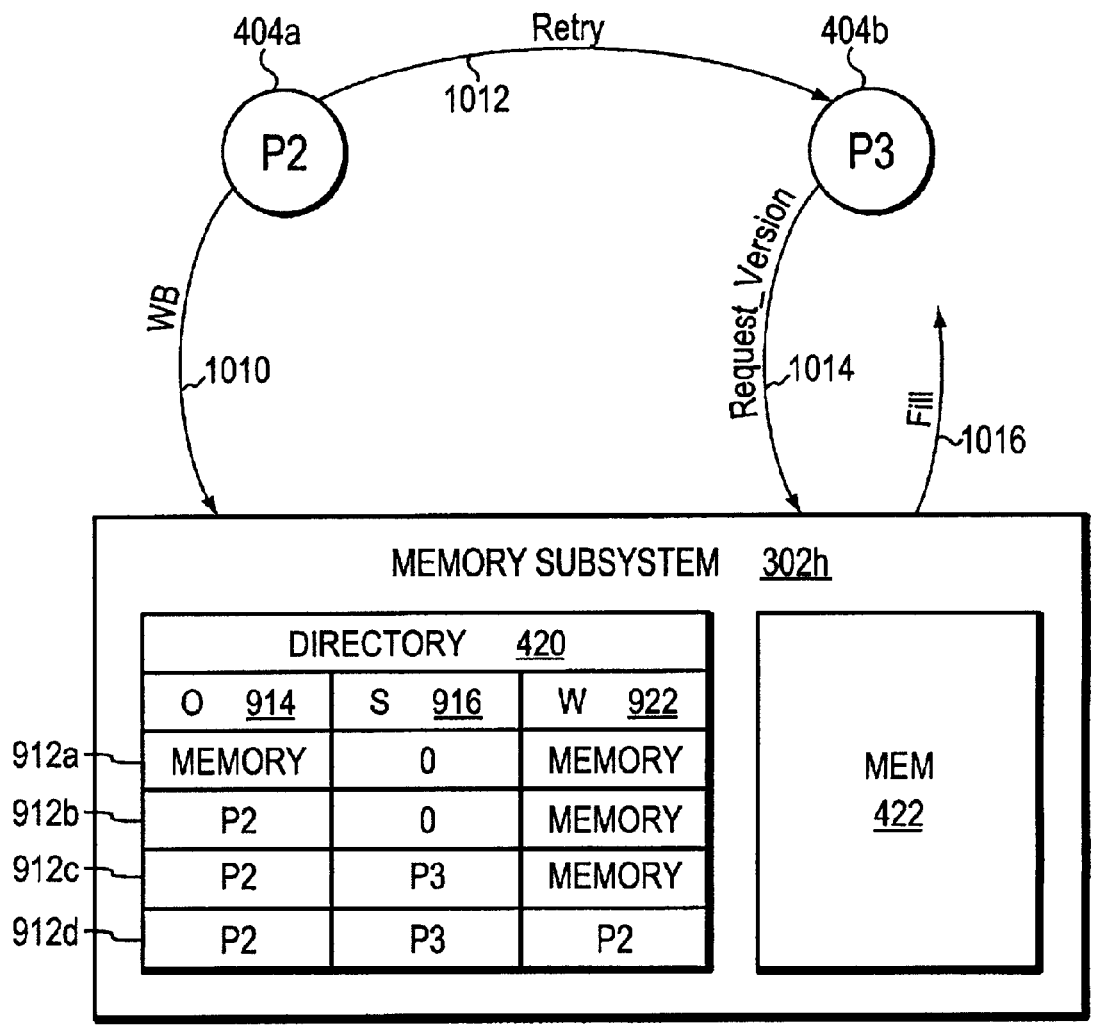

Accordingly, as shown in FIG. 10B, the memory subsystem 302h issues a FRead command 1008 to processor P2 on the Q1 virtual channel. The FRead command 1008 instructs P2 to send processor P3 a copy of the memory block from P2's cache, which memory subsystem 302h considers to be the most up-to-date version of the memory block. As part of its processing of the Read command 1006, memory subsystem 302h also updates the directory 420 to reflect that P3 is a sharer of the memory block. More specifically, the memory controller enters the PID assigned to processor P3 into sharer list field 916. Directory entry 912c (FIG. 10B) illustrates how entry 912b would appear upon completion of the Read command 1006 by the memory subsystem 302h.

Suppose further, however, that sometime before the FRead command 1008 reaches P2, that P2 issues a WB command 1010 (FIG. 10B) on the Q0 virtual channel returning the modified data to its home memory subsystem 302h. When the FRead command 1008 is received at P2, it is placed in the probe/response queue 410 and a search is performed of the cache tags storage device 406 based on the address specified in the FRead command 1008. Queue 410 may also search the entries of MAF table 414 using the address of the command as an index. However, because the memory block was victimized from P2's cache upon issuance of the WB command 1010, the search of cache tags storage device 406 results in a cache miss. A search of MAF table 414, however, identifies a matching entry for the address specified in the FRead command 1008, indicating that the memory block was returned to memory subsystem 302h in WB command 1010. This scenario, in which the FRead command 1008 reaches its intended destination, processor P2, only to find that the desired data is no longer there, is referred to as a late race condition as a race for the block between the WB command 1010 and the FRead command 1008 is now underway.

In accordance with the present invention, P2 is configured to respond to the cache miss caused by the FRead command 1008 by issuing a Retry command 1012 (FIG. 10C) to source processor P3. The Retry command 1012, moreover, is preferably issued on the Q2 virtual channel, which as described above is assigned the highest priority of all of the virtual channels. The Retry command 1012 is received and buffered at P3's probe/response queue 410. The receipt of a Retry command 1012 indicates to P3 that a late race for the desired memory block has occurred. In response, the MAF engine 412 at P3 locates the corresponding MAF entry that was created for the underlying request, i.e., for Read command 1006, and transitions the state of the MAF entry as reflected in the Fill/Marker state field 520 from the Active state 604 (FIG. 6) to the Version_Pending state 606, as indicated by arrow 614. The corresponding MAF entry at P3 may be specified in the Retry command's source MAF entry field 808 (FIG. 8).

As the SMP system 300 was unable to provide P3 with the desired memory block in response to P3's Read command 1006, P3 is configured in accordance with the present invention to generate and issue a Request_Version command 1014 (FIG. 10D), for the desired memory block. The Request_Version command 1014, which has the same format as the other commands as illustrated in FIG. 8, is similar to Read command 1006, but it specifies a particular version of the memory block. Specifically, the command field 802 of the Request_Version command 1014 is loaded with the opcode associated with the Request_Version type command, the address field 804 is loaded with the physical address of the desired memory block, the source ID field 806 is loaded with the PID assigned to processor P3, the source MAF entry field 808 carries the entry number within P3's MAF table 414 for the entry corresponding to this command, and the destination ID field 810 is loaded with the block's home memory subsystem ID. P3 may also store the requested version in the respective MAF entry.

In the version field 812 of the Request_Version command 1014, P3 specifies the version of the memory block that it is seeking. In particular, P3 enters the ID assigned to P2 which sourced the Retry command 1012. That is, P3 recognizes that the version of the memory block that P3 is seeking is the version owned by P2, but in the process of being written back to memory. The Request_Version command 1014 is preferably issued on the Q0 virtual channel. Upon issuance of the Request_Version command 1014, P3's MAF entity 408 preferably transitions the state of the MAF entry from the Version_Pending state 606 (FIG. 6) to the Version_Sent state 608, as indicated by arrow 616.

Because the Q0 virtual channel has a lower priority than the Q2 virtual channel on which the WB command 1010 is traveling, the WB command 1010 will typically arrive at the home memory subsystem 302h before the Request_Version command 1014. It is nonetheless possible that the Request_Version command 1014 may arrive at the home memory subsystem 302h ahead of the WB command 1010 as the WB command, which carries the modified block, is a much larger command packet than the Request_Version command 1014.

Suppose that the WB command 1010 arrives first or is at least processed ahead of the Request_Version command 1014 at memory subsystem 302h. As described above, when the WB command 1010 is received at memory subsystem 302h, the modified data is written to the memory device 422 and the directory entry's writer field 922 is updated with the PID assigned to P2. Directory entry 912d (FIG. 10d) illustrates how entry 912c would appear following the processing of the WB command 1010 at memory subsystem 302h. In particular, writer field 922 is updated, but owner and sharer fields 914 and 916 are left unchanged.

When the Request_Version command 1014 is received at the home memory subsystem 302h, the memory controller 418 accesses the directory entry, i.e., entry 912d (FIG. 10D), for the memory block. Because the command is a Request_Version command, memory controller 418 compares the value stored in the writer field 922 with the version specified in the version field 812 of the Request_Version command 1014. In this case, both values match. That is, both the writer field 922 of the directory entry 912d, and the version field 812 of the Request_Version command 1014 contain the same value, namely the PID assigned to processor P2. Accordingly, the memory controller 418 concludes that the version of the memory block stored in memory device 422 is the version specified in the Request_Version command 1014, and that memory is the owner of the block. The memory controller 418 thus responds to the Request_Version command 1014 by issuing a Fill command 10 (FIG. 10D) to processor P3 that includes a copy of the memory block taken from memory device 422. The Fill command 1016 is sent on the Q2 virtual channel.

Because P3 was already added to the sharer list field 916 of directory entry 912d, in response to the Read command 1006, the memory controller 418 makes no change to directory entry 912d in response to receipt of the Request_Version command 1014 or in response to issuing the Fill command 1016. In other words, a Request_Version command does not cause an update or modification to any fields of the respective directory entry. It only causes the memory controller 418 to read one or more of those fields, e.g., the writer field 922, to determine how to respond.

When the Fill command 1016 is received at processor P3, the MAF engine 412 updates the corresponding MAF entry and may buffer the received block in the MAF buffer 416. In particular, MAF engine 412 transitions the state of the MAF entry from the Version_Sent state 608 (FIG. 6) to the Idle state 602, as indicated by arrow 618, as the requested memory block has now been received. The block may then be transferred out of MAF buffer 416 and into P3's cache.

Suppose instead that the Request_Version command 1014 arrives at the home memory subsystem 302h before WB command 1010 from processor P2. That is, although the Request_Version command 1014 is issued on the Q0 virtual channel, which has a lower priority than the Q2 virtual channel on which the WB command 1010 from P2 was issued, it nonetheless arrives at the home memory subsystem 302h or is at least processed ahead of the WB command 1010. As before, the memory controller 418 compares the contents of the writer field 922 from directory entry 912c with the value contained in the version field 812 of the received Request_Version command 1014. Although the version field 812 indicates the PID for processor P2, the writer field 922 indicates memory, as the WB command 1010 from P2 has yet to be received. Accordingly, the memory controller 418 concludes that the version of the memory block currently stored in memory device 422 is not the version being requested by processor P3.

Figure 10E:
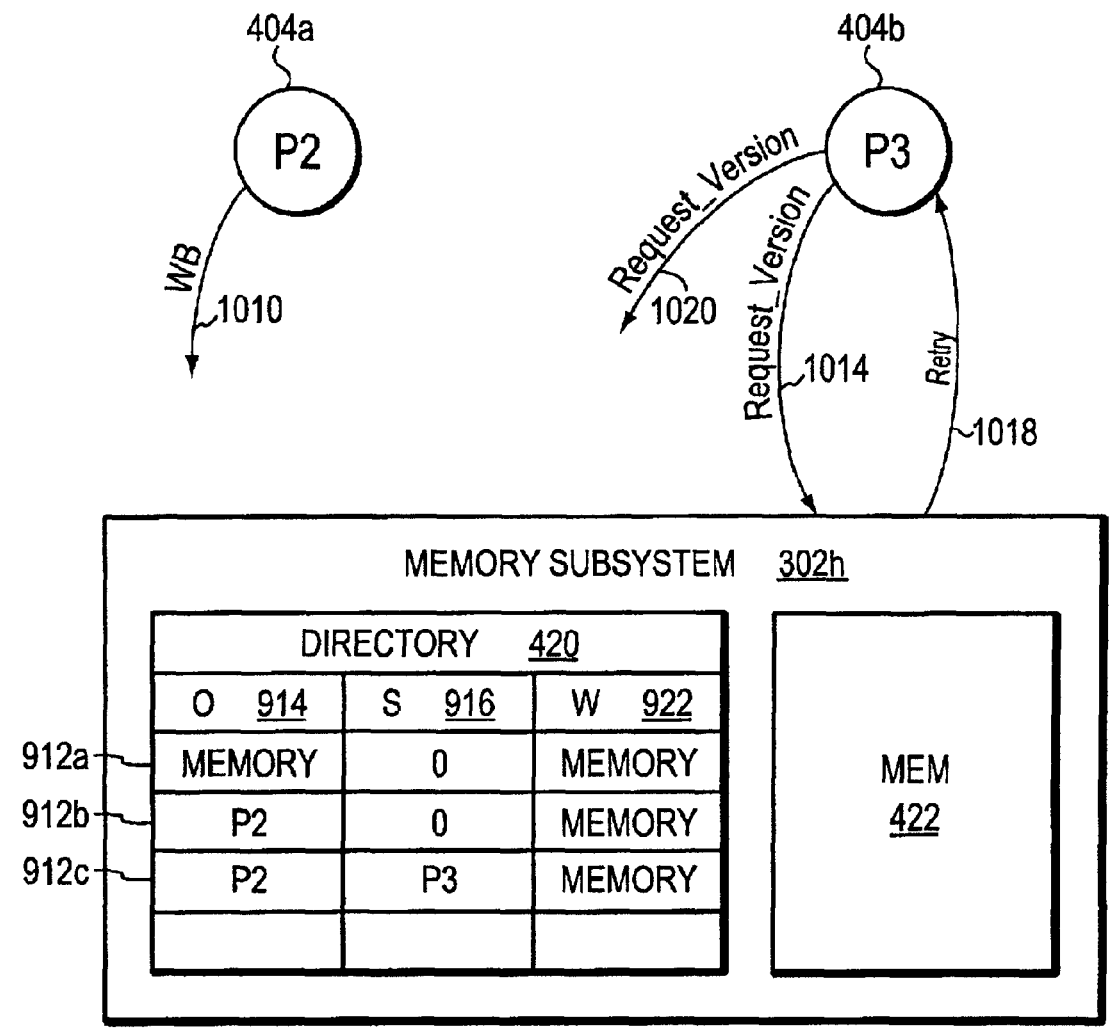
Figure 10F:
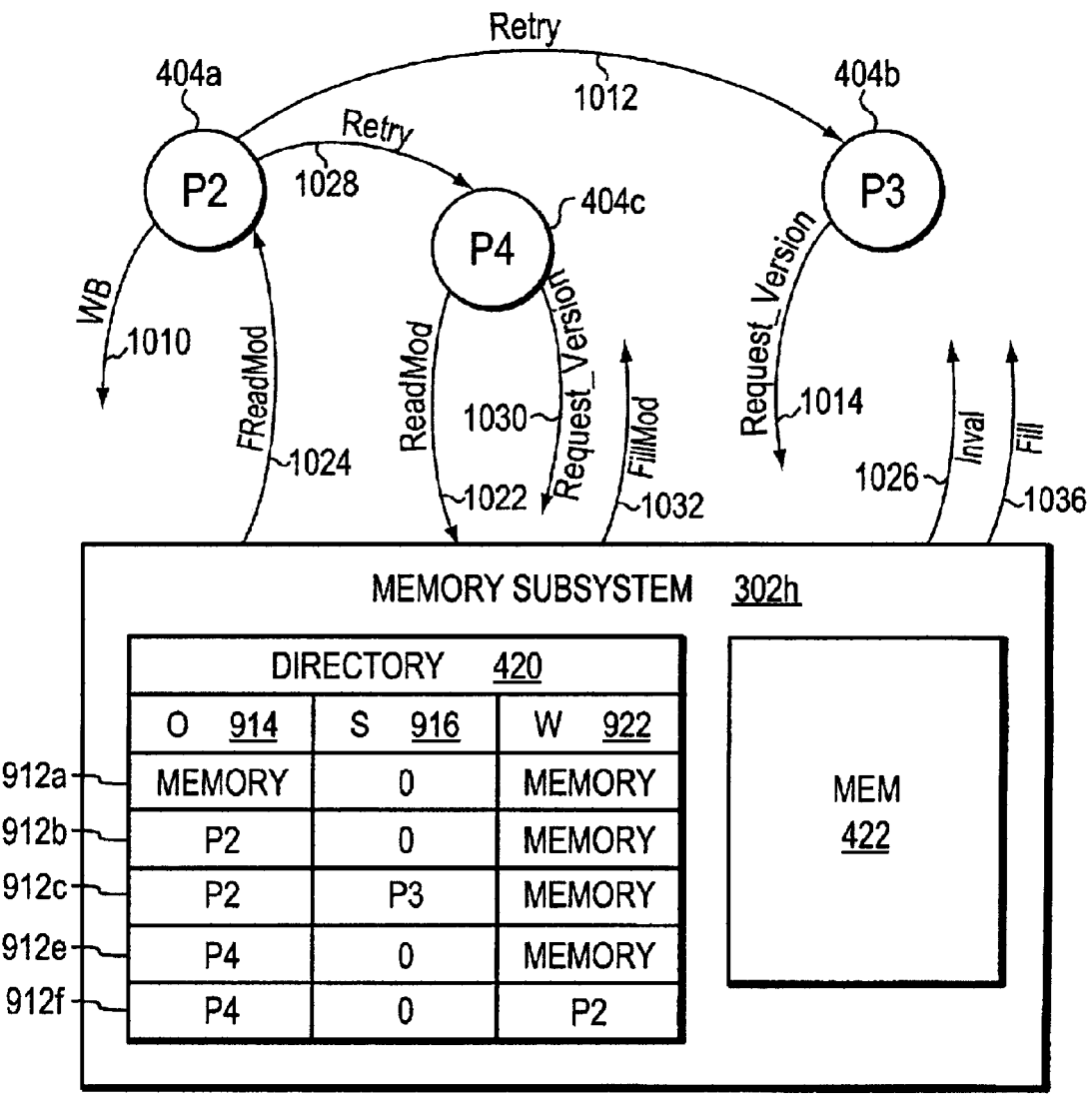

In this case, the home memory subsystem 302h responds to processor P3 with a Retry command 1018 (FIG. 10E). The memory controller 418 may load the version field 812 of the Retry command 1018 with the same version value that was specified in the received Request_Version command 1014. Memory controller 418 makes no change to the directory entry 912c. In response to the Retry command 918 from the home memory subsystem 302h, P3's MAF entity 408 transitions the state of the MAF entry from the Version_Sent state 608 back to the Version_Pending state 606, as indicated by arrow 620, to reflect that P3 has yet to receive the desired memory block. Processor P3 also issues another Request_Version command 1020 (FIG. 10E) to the home memory subsystem 302h. This second Request_Version command 1020 carries the same value, i.e., the PID of processor P2, in its version field 812 as did the previous Request_Version command 1014 sent by P3. Upon issuance of the second Request_Version command 1020, MAF entity 408 transitions the Fill/Marker state associated with the MAF entry from the Version_Pending state 606 to the Version_Sent state 608.

When the second Request_Version command 1020 is received at the home memory subsystem 302h, the memory controller 418 again compares the value stored in the writer field 922 of directory entry 912c with the value from the version field 812 of the received Request_Version command 1020. If P2's WB command 910 has been received by the time the second Request_Version command 920 is received, then the writer field 922 will match the second Request_Version command's version field 812, and the memory controller 418 can respond to processor P3 with a Fill command 1016 (FIG. 9D) that includes the memory block as copied from memory device 422. If the WB command 1010 has still not been received by the time of the second Request_Version command 1020, the memory controller 418 responds to processor P3 with yet another Retry command (not shown) similar to Retry command 1018. This process of responding to Request Version commands with Retry commands is repeated until the WB command 1010 is processed by the home memory subsystem 302h and a Fill command can be returned to processor P3.

As shown, if the version specified by a Request_Version command is not at the home memory subsystem, the memory subsystem responds to the requesting entity with a Retry command. The memory subsystem does not forward the Request_Version command to some other entity for servicing as is the case for a Read command identifying a memory block owned by some entity other than the home memory subsystem.

Suppose that, before the home memory subsystem 302h receives either the WB command 1010 from P2 or one of the Request_Version commands 1014, 1020 from P3, the memory subsystem 302h receives a ReadMod command 1022 (FIG. 10F) for the same memory block from another processor, e.g., processor P4 or 404c. The home memory will access the directory entry 912c to determine the current owner. As the owner and writer fields 914, 922 specify different entities, the memory controller 418 concludes that the entity specified in the owner field 914, i.e., P2, is the owner. Accordingly, the memory controller 418 issues a FReadMod command 1024 to processor P2. Because directory entry 912c also indicates that processor P3 has a copy of the memory block, the memory controller sets the inval count field of the FReadMod command 1024 to two, and issues an Inval command 1026 to processor P3. Memory controller 418 also updates the directory entry 912c to indicate that processor P4 is now the owner of the memory block and that there are no sharers. Entry 912e (FIG. 10F) shows how the directory entry would appear following these updates.

As explained above in connection with FRead command 1008, the FReadMod command 1024 will miss at P2's cache as the memory block has been victimized in WB command 1010. In accordance with the invention, processor P2 issues a Retry command 1028 to processor P4. The Retry command 1028 carries an inval count of two as contained in the FReadMod command 1024 from the home memory subsystem 302h. In response to the Retry command 1028, processor P4 issues a Request_Version command 1030 to the home memory subsystem 302h. In the version field 812 of this Request_Version command 1030, P4 loads the PID assigned to processor P2 as P4 is looking to receive the version of the memory block as written back by processor P2, which is the entity that issued the Retry command 1028.

Processors, including P4, may be configured to treat Retry commands, such as Retry 1028, as also signaling that the source, in this case P2, has properly updated its cache, as necessary. That is, the Retry command 1028 not only sets the Inval Count field at P4's respective MAF entry to two, but it also increments the IAck Count field by one. Alternatively, P2 may issue a separate IAck to P4 in addition to the Retry command 1028.

Suppose the WB command 1010 is received at the home memory subsystem before the Request_Version command 1030. In response to the WB command 1010, the writer field of the directory entry is updated with the ID assigned to the writer, i.e., processor P2, and the memory block is copied into memory device 422 replacing the existing version. Entry 912f (FIG. 10F) shows how directory entry 912e would appear following the memory controller's processing of the WB command 1010.

When P4's Request_Version command 1030 is received, the memory controller 418 compares the values in the writer field 922 with the value in the version field 812 of the received Request_Version command 1030. Here, the command's version field 812 matches the entry's writer field 922. Thus, memory controller 418 concludes that the requested version is stored at memory device 422, and issues a FillMod (or a Fill) command 1032 to P4. As the Retry command 1028 already notified P4 that the inval count for the underlying ReadMod command 1022 is two, and because the directory entry preferably does not keep track of the Invals that it sent and the Request_Version command 1030 does not carry an Inval count, the FillMod command 1032 does not carry this information.

Figure 10G:
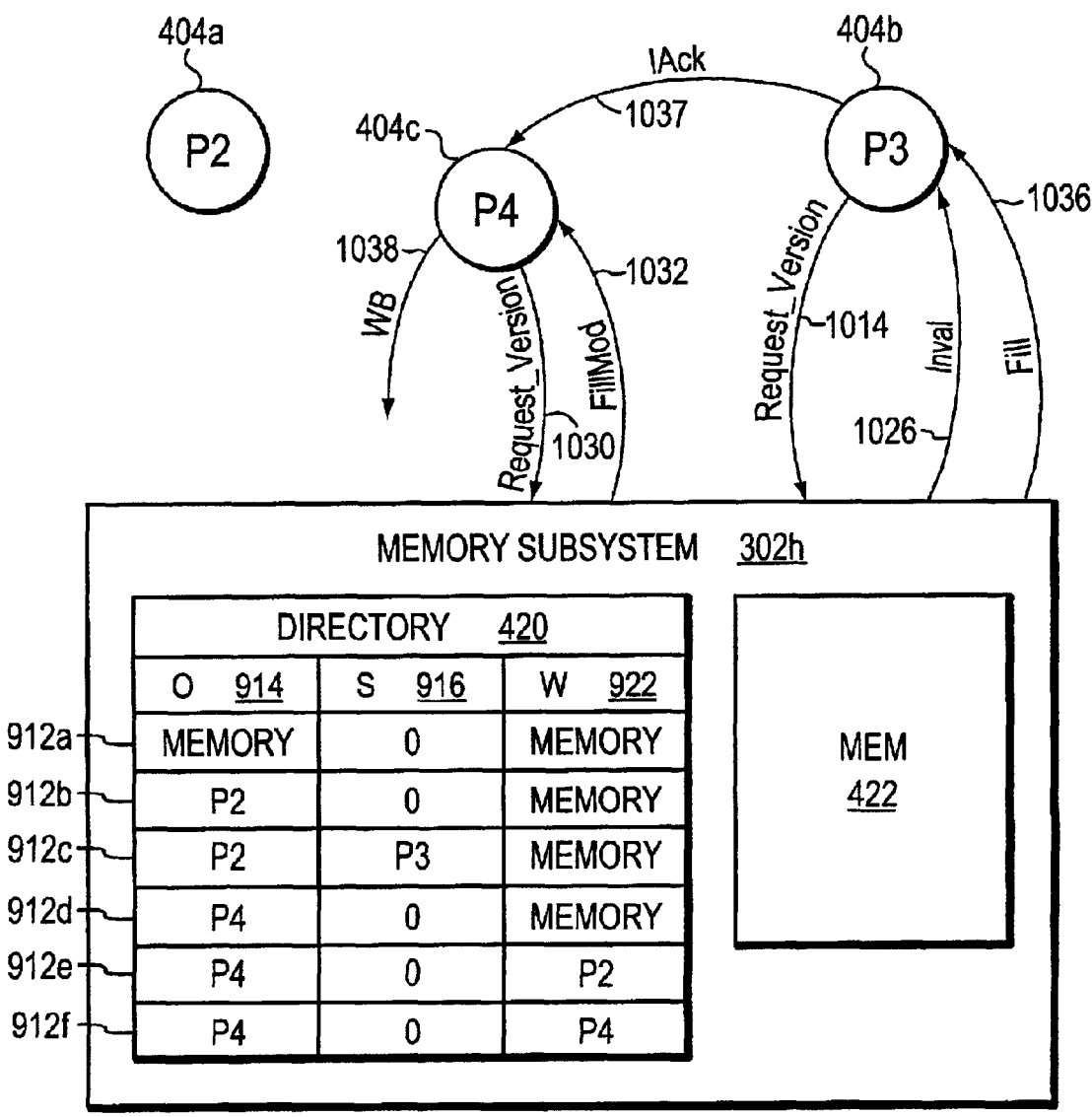

The Inval command 1026 is preferably stored at P3's MAF for subsequent replaying upon receipt of the memory block. As indicated above, until the WB command 1010 is processed by the home memory subsystem 302h, the memory controller keeps responding to Request_Version commands from P3 with Retries. Once the WB command 1010 is processed, the contents of the directory entry's writer field 922 will match the specified version, and the memory controller will issue a Fill command 1036 (FIG. 10F) to P3. P3 places the memory block in its cache and then replays the Inval command 1026 that it stored in its MAF. More specifically, P3 invalidates the memory block and issues an IAck command 1037 to P4 (FIG. 10G).

A suitable mechanism for storing and replaying Invals is described in co-pending, commonly owned U.S. patent application Ser. No. 10/263,738 titled LINKED LIST EARLY RACE RESOLUTION MECHANISM, filed Oct. 3, 2002, which is hereby incorporated by reference in its entirety.

The data processing entities of the SMP system are specifically precluded from issuing WB commands until they have received all outstanding IAcks for the respective memory block. Accordingly, P4 cannot issue a WB command until it has received two IAcks, one from the memory subsystem 302h on behalf of P2 and one from P3. This guarantees that, at some point in time, the directory entry's writer field 922 will match the specified version from P3's Request_Version command. Thus, P3 is guaranteed to receive the memory block, even if ownership is subsequently passed on to one or more other entities, such as P4 in the foregoing example.

Once P4 has received the last outstanding IAck command 1037, it can issue a WB command 1038 writing the memory block, as modified by P4, back to the home memory subsystem 302h. The memory controller responds by entering P4's PID in the writer field and storing the memory block in memory 422. Directory entry 912f (FIG. 10G) indicates how entry 912e would appear following the memory controller's processing of the WB command 1038 from P4.

The foregoing description has been directed to specific embodiments of the present invention. It will be apparent, however, that other variations and modifications may be made to the described embodiments, with the attainment of some or all of their advantages. For example, the SMP system could employ a plurality of physically independent channels, each having its own components, such as individual buffers, logic and communication paths, instead of virtual channels that share such components. Therefore, it is the object of the appended claims to cover all such variations and modifications as come within the true spirit and scope of the invention.

What is claimed is:

1. In a computer system having a plurality of processors and a main memory organized into a plurality of memory blocks, the processors having one or more caches, a method for resolving a late race condition between a first processor and a second processor for a given memory block, the method comprising the steps of:
   forwarding from main memory to the first processor a memory request specifying the given memory block, the memory request initiated by the second processor;
   writing back a modified version of the given memory block from the first processor's cache to main memory;
   in response to the memory request, issuing a Retry command from the first processor to the second processor;
   in response to the Retry command, issuing a memory version request from the second processor to main memory, the memory version request specifying a selected version of the given memory block;
   sending the given memory block from main memory to the second processor provided that the version of the given memory block at main memory matches the selected version specified in the memory version request from the second processor.

2. The method of claim 1 further comprising the step of sending a Retry command from main memory to the second processor provided that the version of the given memory block at main memory does not match the selected version specified in the memory version request from the second processor.

3. The method of claim 2 wherein the selected version specified in the memory version request is the modified version being written back to main memory by the first processor.

4. The method of claim 2 further comprising the step of determining whether the version of the given memory block as stored in main memory corresponds to the selected version specified in the memory version request.

5. The method of claim 1 wherein the memory request forwarded to the first processor results in a miss at the first processor's cache as a result of the given memory block being written back to main memory.

6. The method of claim 2 further comprising the step of sending a second memory version request from the second processor to main memory in response to the Retry command from main memory, the second memory version request specifying the selected version of the given memory block.

7. The method of claim 4 wherein
   the computer system further includes at least one directory for use in maintaining coherence of the memory blocks configured at main memory, the directory having, for each memory block, an owner field specifying the owner of the respective memory block, a sharer list specifying zero, one or more processors that have a shared copy of the respective memory block, and a writer field specifying the last processor to have written the respective memory block back to main memory, and
   the writing back step comprises the step of entering an identifier (ID) assigned to the first processor in the writer field of the directory entry for the selected memory block.

8. The method of claim 7 wherein the determining step comprises the step of comparing the writer field of the directory entry for the given memory block with the selected version specified in the memory version request.

9. The method of claim 8 wherein, if the writer field matches the selected version, performing the step of sending the given memory block from main memory to the second processor.

10. The method of claim 1 wherein the memory request is one of a Forwarded_Read command requesting shared access to the given memory block and a Forwarded_Read_Modify command requesting write access to the given memory block.

11. The method of claim 10 wherein the memory version request is a Request_Version command.

12. The method of claim 1 further comprising the step of defining a plurality of channels within the computer system for exchanging command packets among the processors and main memory, the channels including a Q0 channel for carrying requests for memory blocks, a Q1 channel, having a higher priority than the Q0 channel, for carrying probes in response to Q0 requests, and a Q2 channel, having a higher priority than the Q1 channel, for carrying responses to Q0 requests, wherein the writing back step comprises the step of issuing a WB command to main memory, the WB and Retry commands are issued in the Q2 channel, and the memory version request is issued in the Q0 channel.

13. The method of claim 12 wherein the computer system has physical interconnect links and buffering resources coupling the processors and main memory, and each channel is an independently flow-controlled virtual channel of commands that shares the physical interconnect link and buffering resources with the other channels.

14. A computer system comprising:

a plurality of processors, each processor having one or more caches; and a main memory coupled to the plurality of processors by an interconnect fabric, the main memory organized to store data in terms of memory blocks at least one or more of which are shared by the plurality of processors, wherein, one or more processors are configured to (1) issue a Retry command in response to a memory request received by the one or more processors that specifies a given memory block that the one or more processors have written back from the one or more processor's cache to main memory, and (2) respond to a Retry command by issuing a memory version request that specifies a selected version of the given memory block.

15. The computer system of claim 14 wherein main memory sends a processor that issued the memory version request the given memory block provided that the version of the given memory block at main memory matches the selected version specified in the memory version request.

16. The computer system of claim 14 wherein main memory sends the processor that issued the memory version request a Retry command that does not include the given memory block provided that the version of the given memory block at main memory does not match the selected version specified in the memory version request.

17. The computer system of claim 14 wherein, the memory request specifying the given memory block originates from a source processor and is received at a target processor that wrote the given memory block back to main memory, the Retry command is issued to the source processor, and includes a processor identifier (PID) assigned to the target processor, the selected version specified in the memory version request corresponds to the PID of the target processor.

18. The computer system of claim 17 further comprising one or more directories for use in maintaining coherence of the memory blocks, the one or more directories having an entry for each memory block, each directory entry including an owner field for specifying an owner of the memory block, and a writer field for specifying the last processor to have written the memory block back to the main memory, wherein the version of the given memory block matches the version specified in the memory version request when the writer field of the directory entry for the given memory block corresponds to PID of the target processor as specified in the memory version request.

19. The computer system of claim 18 wherein the one or more directories support execution of a low occupancy cache coherency protocol permitting multiple memory requests to the same memory block to be executing within the computer system substantially simultaneously.

* * * * *